United States Patent
Tamura et al.

(10) Patent No.: US 6,523,905 B2
(45) Date of Patent: Feb. 25, 2003

(54) CRAWLER CARRIER HAVING AN ENGINE, A HYDRAULIC PUMP AND A HEAT EXCHANGER POSITIONED IN A LATERAL DIRECTION

(75) Inventors: Seiji Tamura, Tomobe-machi (JP); Morio Oshina, Chiyoda-machi (JP); Kiyoshi Hirasawa, Higashine (JP); Tsuyoshi Takayama, Higashine (JP); Yoshinori Sendai, Higashine (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/946,453

(22) Filed: Sep. 6, 2001

(65) Prior Publication Data

US 2002/0030397 A1 Mar. 14, 2002

(30) Foreign Application Priority Data

Sep. 8, 2000 (JP) .......................... 2000-272616
Sep. 8, 2000 (JP) .......................... 2000-272617

(51) Int. Cl.[7] .......................... B60K 5/04; B62D 25/10; B60P 1/04
(52) U.S. Cl. ................. 298/22 R; 298/17 R; 298/19 R; 180/68.4; 180/69.2; 180/291; 180/297; 180/306
(58) Field of Search .................. 298/9, 17 R, 19 R, 298/21 R, 22 R; 180/53.4, 68.4, 68.6, 69.2, 291, 297, 300, 305, 306

(56) References Cited

U.S. PATENT DOCUMENTS

| | | | | |
|---|---|---|---|---|
| 3,404,470 A | * | 10/1968 | Raiti | 37/228 |
| 3,921,742 A | * | 11/1975 | May et al. | 180/234 |
| 4,189,021 A | * | 2/1980 | Scheuerpflug et al. | 180/69.6 |
| 4,443,236 A | * | 4/1984 | Peiler | 55/282.5 |
| 5,816,350 A | * | 10/1998 | Akira et al. | 180/68.1 |
| 6,116,697 A | * | 9/2000 | Smith et al. | 298/22 R |
| 2001/0006128 A1 | * | 7/2001 | Contoli et al. | 180/68.4 |

FOREIGN PATENT DOCUMENTS

| | | | | |
|---|---|---|---|---|
| JP | 60004440 A | * | 1/1985 | 298/11 |
| JP | 9-86261 | | 3/1997 | |

* cited by examiner

Primary Examiner—Stephen T. Gordon
Assistant Examiner—Paul Chenevert
(74) Attorney, Agent, or Firm—Mattingly, Stanger & Malur, P.C.

(57) ABSTRACT

A crawler carrier capable of smoothly operating a driving force source even at a slant. The driving force source is arranged between a dump body and a cab and laid in a lateral direction and at the same time the driving force source and a heat exchanger are arranged in series in a lateral direction. With such an arrangement as above, the driving force source can be arranged at an upper structure frame under a state in which it becomes substantially horizontal without interfering with the dump body. Even when the crawler carrier performs work at a slant the engine can always be lubricated with lubricant oil and the driving force source can be operated smoothly.

10 Claims, 18 Drawing Sheets

CRAWLER CARRIER HAVING AN ENGINE, A HYDRAULIC PUMP AND A HEAT EXCHANGER POSITIONED IN A LATERAL DIRECTION

BACKGROUND OF THE INVENTION

1. Field of the Invention

This invention relates to a crawler carrier which is suitable for transporting soil and sand or the like scraped under application of a hydraulic excavator and the like, for example, to a desired soil depositing location.

2. Description of the Prior Art

It is generally known in the prior art to provide a crawler carrier for use in transporting soil and sand scraped under application of a hydraulic excavator and the like at a mountain area and an unlevel ground, etc. in which the same is comprised of a lower travelling structure having crawlers at both right and left sides, for example, and an upper structure mounted on the lower travelling structure and having a dump body for use in loading transported materials such as soil and sand or the like (refer to the gazette of Japanese Patent Laid-Open No. Hei 9-86261, for example).

In view of this fact, referring now to FIGS. 11 to 18, the crawler carrier of this kind of prior art will be described as follows.

At first, FIGS. 11 to 14 illustrate the crawler carrier in accordance with the first prior art, wherein this revolving type crawler carrier 1 is substantially constituted of a lower travelling structure 2 and an upper revolving structure 11 to be described later.

Reference numeral 2 denotes a lower travelling structure of self-travelling type, wherein the lower travelling structure 2 is substantially comprised of a track frame 3; right and left driving wheels 4 and 4 arranged at the front end side of the track frame 3 and driven by a travel motor (not shown); right and left idling wheels 5 and 5 rotatably arranged at the rear end side of the track frame 3; and right and left crawlers 6 and 6 arranged to be wound around the driving wheel 4 and the idling wheel 5. Then, the lower travelling structure 2 moves on the unlevel ground and muddy land or the like by driving the crawler 6 by the driving wheel 4.

Denoted at 7 is a swing mechanism provided between the lower travelling structure 2 and the upper revolving structure 11 to be described later, wherein the swing mechanism 7 is constituted by a swing ring 7A arranged between the track frame 3 of the lower travelling structure 2 and a revolving frame 12 to be described later; and a swing motor 7B fixed to the revolving frame 12. Then, the swing mechanism 7 is used for turning the upper revolving structure 11 on the lower travelling structure 2 while hydraulic fluid is fed from a hydraulic pump 19 to be described later to the swing motor 7B or discharged from it, thereby the upper revolving structure 11 is revolved on the lower travelling structure 2.

Reference numeral 11 denotes an upper revolving structure acting as an upper structure installed on the lower travelling structure 2 in such a way that it may be swung through the swing mechanism 7. In this case, the upper revolving structure 11 is comprised of a revolving frame 12, a dump body 13, a cab 15, a driving force source 17, a heat exchanger 20, an operating oil tank 26 and a fuel tank 28 and the like to be described later.

Denoted at 12 is a revolving frame acting as an upper structure frame constituting a base of the upper revolving structure 11. In this case, the revolving frame 12 constitutes a rigid supporting structure by the right and left longitudinal beams 12A extending in forward and rearward directions; a plurality of lateral beams (not shown) extending in rightward and leftward directions to connect between each of the longitudinal beams 12A; and a support frame 12B installed at the front side of each of the longitudinal beams 12A to support the cab 15 and an engine 18 or the like to be described later. Then, the revolving frame 12 is installed on the lower travelling structure 2 in such a way that it can be revolved through the swing mechanism 7.

Denoted at 13 is a dump body arranged to extend from the intermediate portion of the revolving frame 12 to the rear portion thereof, wherein the dump body 13 is formed into a box-shape having a bottom part with its upper portion being opened and on its lower surface is provided a dump body frame 13A extending in the forward and rearward directions. The rear end side of the dump body frame 13A is rotatably connected to the rear end side of the longitudinal beam 12A constituting the revolving frame 12, and a dump body ascending or descending cylinder 14 is installed between the dump body frame 13A and the longitudinal beam 12A of the revolving frame 12. Then, the dump body ascending or descending cylinder 14 is extended or retracted to cause the dump body 13 to be inclined in respect to the revolving frame 12, thereby the soil and sand loaded on the dump body 13 are unloaded.

Indicated at 15 is a cab defining a driver's room, wherein the cab 15 is positioned at the front side of the dump body 13 and installed at one side (the left side) of the rightward and leftward directions of the support frame 12B constituting the revolving frame 12. Then, the cab 15 is formed into a box-shape enclosed by a front surface 15A, a rear surface 15B, right and left side surfaces 15C and 15D and an upper surface 15E. In this case, the lower side of the rear surface 15B forms a recessed portion 15F recessed to the front surface 15A side, and a fuel tank 28 to be described later is installed between the recessed portion 15F and the dump body 13. Then, within the cab 15 are installed a driver's seat 16 where an operator sits, travel levers, and operation levers (not shown) for operating the dump body 13.

Reference numeral 17 denotes a driving force source positioned at the front side of the revolving frame 12 and installed at the other side (the right side) of the rightward and leftward directions. In this case, as shown in FIGS. 12 and 13, the driving force source 17 is substantially constituted of an engine 18 provided with an intake air cleaner 18A; and a hydraulic pump 19 driven by the engine 18 and for feeding or discharging hydraulic oil to or from a travel motor (not shown) for the lower travelling structure 2, the swing motor 7B and the dump body ascending or descending cylinder 14 and the like. A plurality of a main pump, a pilot pump and the like constitute the hydraulic pump 19.

Indicated at 20 is a heat exchanger positioned at the front side of the driving force source 17 and installed at the revolving frame 12. In this case, the heat exchanger 20 is arranged to be oppositely faced against a fan 18B of the engine 18, and cooled with cooling air produced by the fan 18B. The heat exchanger 20 is substantially constituted by a radiator 21 for cooling the engine 18, and an oil cooler 22 for cooling hydraulic oil discharged from the hydraulic pump 19.

In this case, the driving force source 17 and the heat exchanger 20 are installed at the revolving frame 12 while they are arranged in series in a forward and rearward direction. The rear end side of the hydraulic pump 19 extends beneath the dump body 13. Due to this fact, as shown in FIG. 13, the driving force source 17 is fixed to the revolving frame 12 under a state in which a center X1—X1 of a crank shaft of the engine 18 is inclined by an angle θ1 in respect to a horizontal direction so as to avoid any interference between the rear end side of the hydraulic pump 19 and the dump body 13.

Denoted at 23 is an engine cover installed at the front side of the dump body 13, wherein the engine cover 23 covers the engine 18 and a part of the hydraulic pump 19. Numeral 24 denotes a pump cover arranged at the rear side of the engine cover 23, wherein the pump cover 24 covers the rear end side of the hydraulic pump 19 entered into the lower side of the dump body 13 so as to prevent the hydraulic pump 19 and some hydraulic hoses (not shown) connected to the hydraulic pump 19 and the like from being damaged by soil and sand or the like dropped from the dump body 13. Numeral 25 denotes a heat exchanger cover arranged at the front side of the engine cover 23, wherein the heat exchanger cover 25 covers the heat exchanger 20.

Indicated at 26 is an operating oil tank positioned between the cab 15 and the driving force source 17 and installed at a front central part of the revolving frame 12, wherein the operating oil tank 26 stores operating oil to be fed to or discharged from the travel motor (not shown) of the lower travelling structure 2, the swing motor 7B and the dump body ascending or descending cylinder 14 or the like.

In this case, as shown in FIGS. 12 to 14, the engine cover 23 and the heat exchanger cover 25 are arranged to be adjacent in a forward and rearward direction from the front side of the dump body 13 to the front end of the revolving frame 12. In addition, the operating oil tank 26 is installed between the engine cover 23, the heat exchanger cover 25 and the cab 15 while being adjacent to them. Then, the upper surfaces of the engine cover 23, the heat exchanger cover 25 and the operating oil tank 26 form substantially the same flat surface at the position of a height size H1 from the revolving frame 12.

Denoted at 27 is a partition plate positioned between the driving force source 17, the heat exchanger 20 and the operating oil tank 26 and extending in the forward and rearward direction, wherein the partition plate 27 partitions between the driving force source 17, the heat exchanger 20 and the operating oil tank 26 so as to restrict heat transmitted from the engine 18 of the driving force source 17 and the radiator 21 of the heat exchanger 20 and the like to the operating oil tank 26.

Numeral 28 denotes a fuel tank positioned between the cab 15 and the dump body 13 and installed at the revolving frame 12, wherein the front side of the fuel tank 28 is arranged in the recessed portion 15F provided in the cab 15 and the fuel tank 28 stores fuel supplied to the engine 18.

Numeral 29 denotes a control valve positioned at the right side of the fuel tank 28 and arranged between the dump body 13 and the cab 15, wherein the control valve 29 controls feeding or discharging of hydraulic oil of the hydraulic pump 19 to or from the travel motor (not shown) for the lower travelling structure 2, the swing motor 7B and the dump body ascending or descending cylinder 14 or the like. In addition, numeral 30 denotes a battery positioned at the rear side of the fuel tank 28 and arranged between the revolving frame 12 and the dump body 13.

The revolving type crawler carrier 1 in accordance with the first prior art is constituted as described above, wherein when the sand and soil or the like are transported under application of the crawler carrier 1, the crawler carrier 1 is run toward a scraping site, thereafter the upper revolving structure 11 is turned by the swing mechanism 7 and the dump body 13 is moved near the hydraulic excavator and the like.

Then, after the soil and sand scraped by the hydraulic excavator are loaded onto the dump body 13, the crawler carrier 1 is run to the desired soil discharging site, the dump body 13 is inclined by the dump body ascending or descending cylinder 14 in respect to the revolving frame 12 so as to discharge the soil and sand loaded on the dump body 13.

However, the revolving type crawler carrier 1 in accordance with the aforesaid first prior art had the following problems because the driving force source 17 and the heat exchanger 20 are arranged at the revolving frame 12 under a state in which they are arranged in series in the forward and rearward direction.

At first, the rear end side of the hydraulic pump 19 constituting the driving force source 17 extends beneath the dump body 13. Due to this fact, for a sake of necessity to avoid interference between the rear end side of the hydraulic pump 19 and the dump body 13, the driving force source 17 is arranged at the revolving frame 12 under a state in which the center X1—X1 of the crank shaft of the engine 18 is inclined by an angle θ1 in respect to a horizontal direction.

Due to this fact, in the case that the inclination angle θ1 of the driving force source 17 is increased by the fact that the crawler carrier 1 performs the work at the slant site, for example, lubricant oil stored in an oil pan of the engine 18 displaces substantially toward a location where the low slant site is placed, resulting in that there occurs a possibility that the engine 18 cannot be properly lubricated. Due to this fact, the crawler carrier 1 in accordance with the first prior art shows some problems that an allowable range of the inclination angle where an appropriate work can be carried out is narrow and in the case of such a slant site as a mountain area where a large gradient occurs, for example, a lack of lubrication at the engine 18 may easily occur and a smooth operation of the driving force source 17 is damaged.

In addition, since the rear end side of the hydraulic pump 19 constituting the driving force source 17 extends beneath the dump body 13, it is necessary to arrange the pump cover 24 covering the rear end side of the hydraulic pump 19 entered beneath the dump body 13 separate from the engine cover 23 covering the engine 18, resulting in that it shows a problem that a manufacturing cost for the crawler carrier 1 is expensive.

Further, it becomes difficult to manufacture the fixing means (not shown) for fixing the driving force source 17 to the revolving frame 12 while the driving force source is being inclined and it shows a problem that the manufacturing cost for the crawler carrier 1 becomes expensive.

In turn, in the case that the upper revolving structure 11 of the crawler carrier 1 is turned, it is necessary for an operator in the cab 15 to turn the upper revolving structure 11 while confirming that no hindrance items are present or other workers are not present around the crawler carrier 1. However, both the engine cover 23 and the heat exchanger cover 25 are arranged at the right side of the cab 15 while being adjacent in the forward and rearward direction and these engine cover 23 and heat exchanger cover 25 are projected onto the revolving frame 12 with a large height size H1.

With such an arrangement as above, as shown in FIG. 14, for example, it is assumed that the eye position of the operator (eye point) when the operator sits at a driver's seat 16 within the cab 15 is defined as A1 and an eye sight of the operator when the operator visually sees from the eye point A1 to the rightward location is defined as B1, resulting in that the operator's eye sight B1 is shielded at a high position by the engine cover 23 and the heat exchanger cover 25. In this way, in the case of the revolving type crawler carrier 1 in accordance with the first prior art, the operator's visual field from within the cab 15 is remarkably shielded by the engine cover 23 and the heat exchanger cover 25 of a large height size and the like. Accordingly, the operator must turn the upper revolving structure 11 while the operator cannot confirm sufficiently the right side of the crawler carrier 1, resulting in that it shows a problem that safety characteristic is decreased during the revolving operation.

Further, when the crawler carrier 1 is run on a mountain area and a forest road or the like, it is necessary for the operator in the cab 15 to always confirm on what position the front end part of the crawler 6 is located in respect to a rocky site of mountain or a shoulder of a forestry road. However, as shown in FIG. 12, the heat exchanger cover 25 installed at the right side of the cab 15 is arranged at a position where its front end 25A projects more forwardly by a size d1 from the front end 6A of the crawler 6.

Due to this fact, the operator within the cab 15 is hidden by the heat exchanger cover 25 and cannot confirm sufficiently the position of the front end 6A of the crawler 6, resulting in that it shows a problem that safety characteristics during running operation is decreased.

Next, FIGS. 15 to 18 show a rigid type crawler carrier in accordance with the second prior art, wherein this rigid type crawler carrier 31 is constituted by the lower travelling structure 2 which can run by itself and an upper structure 32 arranged to be fixed on the lower travelling structure 2.

In this case, the lower travelling structure 2 is constituted by the track frame 3, the driving wheel 4, the idling wheel 5 and the crawler 6 and the like in the same manner as those applied in the aforesaid revolving type crawler carrier 1. Then, the upper structure 32 is constituted by an upper structure frame 33, a dump body 34, a cab 36, a driving force source 38 and a heat exchanger 41 and the like.

Reference numeral 33 denotes an upper structure frame fixed on and arranged at the lower travelling structure 2, wherein the upper structure frame 33 forms a rigid supporting structure by right and left longitudinal beams 33A and 33A fixed on the upper surface of the track frame 3 constituting the lower travelling structure 2 and extending in the forward and rearward directions; a plurality of lateral beams (not shown) extending in the rightward and leftward directions and connecting between each of the longitudinal beams 33A; and a frame-shaped support frame 33B arranged at the front end of each of the longitudinal beams 33A to support the cab 36 to be described later.

Denoted at 34 is a dump body arranged from the intermediate part to the rear part of the upper structure frame 33 in the forward and rearward direction, wherein the dump body 34 is formed into a box having a bottom part with its upper part being opened. In this case, since the rigid type crawler carrier 31 does not have a swing mechanism between the track frame 3 and the upper structure frame 33, the dump body 34 is set to be a lower location as compared with the aforesaid revolving type crawler carrier 1. Due to this fact, the front end side of a bottom plate 34A forming a bottom surface of the dump body 34 is provided with an upper bottom part 34B stepped up a little in order to store a part of a hydraulic pump 40 to be described later. In addition, on a lower surface side of the bottom plate 34A of the dump body 34 is provided with a dump body frame 34C extending in the forward and rearward directions, and the rear end side of the dump body frame 34C is rotatably connected to the rear end of the longitudinal beam 33A constituting the upper structure frame 33. Then, a dump body ascending or descending cylinder 35 is arranged between the dump body frame 34C and the longitudinal beam 33A of the upper structure frame 33.

Indicated at 36 is a cab arranged at the front side of the dump body 34, wherein the cab 36 is formed into a box enclosed by a front surface 36A, a rear surface 36B, left and right side surfaces 36C and 36D and an upper surface 36E, and the lower side of the rear surface 36B is formed into a recessed portion 36F. Then, within the cab 36 is arranged a driver's seat 37 or the like where an operator sits.

Reference numeral 38 denotes a driving force source positioned at the front side part of the upper structure frame 33 and arranged at the central part in a lateral direction, wherein the driving force source 38 is substantially comprised of an engine 39 having an air cleaner 39A for intake air and a fan 39B, and a hydraulic pump 40 driven by the engine 39.

Denoted at 41 is a heat exchanger installed at the front side of the driving force source 38, wherein the heat exchanger 41 is comprised of a radiator 42 and an oil cooler 43 and this is cooled with cooling air fed from the fan 39B of the engine 39.

In this case, as shown in FIG. 17, the driving force source 38 is fixed to the upper structure frame 33 under a state in which a center X2—X2 of the crank shaft of the engine 39 is inclined only by an angle $\theta 2$ in respect to a horizontal direction. Due to this fact, the rear end side of the hydraulic pump 40 extends beneath the upper bottom part 34B of the dump body 34.

Numeral 44 denotes an engine cover covering the engine 39 and a part of the hydraulic pump 40. Numeral 45 denotes a pump cover covering the rear end of the hydraulic pump 40 entered into the upper bottom part 34B of the dump body 34. Numeral 46 denotes a heat exchanger cover covering the heat exchanger 41. In this case, as shown in FIG. 18, the upper surfaces of the engine cover 44 and the heat exchanger cover 46 form substantially the same flat surface at the position of size H2 measured from the upper structure frame 33.

Numeral 47 denotes an operating oil tank arranged at the right side of the driving force source 38. Numeral 48 denotes a partition plate installed between the driving force source 38 and the operating oil tank 47. Numeral 49 denotes a fuel tank arranged between the cab 36 and the dump body 34. In addition, numeral 50 denotes a control valve arranged at the right side of the fuel tank 49. Numeral 51 denotes a battery arranged at the front side of the operating oil tank 47.

The rigid type crawler carrier 31 in accordance with the second prior art has the aforesaid constitution, wherein when soil and sand are transported under application of this crawler carrier 31, the soil and sand scraped with a hydraulic excavator and the like are loaded on the dump body 34, and then the crawler carrier 31 is run to the desired soil depositing site, the dump body 34 is inclined by the dump body ascending or descending cylinder 35 in respect to the upper structure frame 33 and the soil and sand loaded on the dump body 34 are discharged out of the dump body.

However, the rigid type crawler carrier 31 in accordance with this second prior art also had a problem substantially similar to that of the revolving type crawler carrier 1 in accordance with the aforesaid first prior art.

At first, the driving force source 38 is installed at the upper structure frame 33 under a state in which a center X2—X2 of the crank shaft of the engine 39 is inclined by an angle θ2 in respect to a horizontal direction. Due to this fact, in the case that the inclination angle θ2 of the driving force source 38 is increased when the operation is performed by the crawler carrier 31 at the slant ground in a mountain area, it shows a problem that the engine 39 produces a lack of lubrication and a smooth operation of the driving force source 38 is deteriorated.

In addition, the engine cover 44 and the heat exchanger cover 46 are installed at the right side of the cab 36 while being adjacent in the forward and rearward direction. Due to this fact, as shown in FIG. 18, if it is assumed that the operator's eye position (eye point) within the cab 36 is defined as A2 and the operator's eye sight when the operator visually sees the right side of the crawler carrier 31 from this eye point A2 is defined as B2, the operator's eye sight B2 is shielded at the high position by the engine cover 44 and the heat exchanger cover 46. Accordingly, there occurs a problem that the operator in the cab 36 cannot confirm sufficiently the right side of the crawler carrier 31 and a safety characteristic of the carrier during its running operation is decreased.

In addition, as shown in FIG. 16, the front end 46A of the heat exchanger cover 46 installed at the right side of the cab 36 is protruded more forwardly by the size d2 than the front end 6A of the crawler 6. Due to this fact, there occurs a problem that the operator in the cab 36 is shielded by the heat exchanger cover 46 and cannot confirm sufficiently the position of the front end 6A of the crawler 6 and a safety characteristic of the carrier during its running operation is deteriorated.

Further, since the upper bottom part 34B for use in storing the rear end of the hydraulic pump 40 is installed at the front end of the bottom plate 34A of the dump body 34, there occurs a problem that a capacity of the dump body 34 is decreased correspondingly by an amount where the upper bottom part 34B is arranged.

SUMMARY OF THE INVENTION

The present invention has been invented in view of the aforesaid problems of the prior art and it is an object of the present invention to provide a crawler carrier in which the driving force source can be operated smoothly even at the slant ground or the like and the operator's eye sight in the cab can be assured to be wide.

In order to solve the aforesaid problems, the present invention is applied to the crawler carrier provided with the lower travelling structure having crawlers positioned at both right and left sides and extending in the forward and rearward directions, and the upper structure arranged on the lower travelling structure.

Then, a feature of the present invention consists in an arrangement in which the upper structure is constituted of an upper structure frame forming a supporting structure; a dump body arranged at the rear part of the upper structure frame to load the articles to be transported; a cab positioned at the front side of the dump body at one side of the right and left sides and arranged at the upper structure frame; a driving force source having of an engine and a hydraulic pump and arranged in the lateral direction between the dump body and the cab; and a heat exchanger positioned at the front side of the dump body at the other side in the lateral direction and arranged in series with the driving force source in the lateral direction.

With such an arrangement as above, since the heat exchanger and the driving force source can be arranged in series in the lateral direction between the dump body and the cab, the driving force source can be arranged by a horizontal state without arranging the part of the driving force source beneath the dump body.

Accordingly, it is not necessary for the driving force source to be arranged in its inclined state to avoid interference between a part of the driving force source and the dump body and thus the fixing means for fixing the driving force source to the upper structure frame can be easily manufactured.

In addition, since the driving force source can be arranged in a horizontal direction, it is possible to prevent lubricant oil for the engine constituting the driving force source from being transferred toward the lower part of the inclined ground when the work is performed at the inclined ground, resulting in that the engine can be lubricated properly with the lubricant oil, so that the driving force source can be operated smoothly even at the inclined ground showing a high gradient such as a mountain region and the like, for example.

Further, it is not necessary to arrange a part of the driving force source below the dump body, so that it is possible to eliminate the cover covering a part of the driving force source entered beneath the dump body.

The present invention is constituted such that the cab is provided with a recessed portion where its rear lower side is recessed, wherein the driving force source is arranged between the dump body and the cab under a state in which its part is positioned beneath the recessed portion of the cab.

With such an arrangement as above, it is possible to avoid interference between the driving force source and the cab by the recessed portion provided at the cab and further to assure a large working space in the cab.

The present invention is constituted such that the driving force source has the engine and the hydraulic pump arranged in series, the hydraulic pump is arranged at the recessed portion side of the cab and the engine is oppositely faced against the heat exchanger.

With such an arrangement as above, since the hydraulic pump having a lower height size than that of the engine is arranged beneath the recessed portion of the cab, it is possible to keep the work space in the cab wider.

The present invention is constructed such that the upper structure frame is provided with a tank section positioned at the front sides of the driving force source and the heat exchanger, at the other side of the lateral direction and comprised of an operating oil tank and a fuel tank.

With such an arrangement as above, it is possible to arrange the operating oil tank and the fuel tank in a surplus manner by utilization of a large space formed at the front sides of the driving force source and the heat exchanger.

The present invention is constructed such that the height size of the tank section is set to be smaller than the height size of the cover covering the driving force source and the heat exchanger.

With such an arrangement as above, since the height size of the tank section arranged at the side of the cab becomes smaller as compared with the height size of the cover covering the driving force source and the heat exchanger arranged between the cab and the dump body, it is possible to prevent the field of view of the operator from being substantially shielded by the tank section when the operator acknowledges the right and left directions from inside the cab, resulting in that the field of view of the operator from inside the cab can be assured wide.

The present invention is constructed such that the tank section is arranged at the upper structure frame at a position where its front end is retracted from the front end of the crawler installed at the lower travelling structure.

With such an arrangement as above, since the front end of the crawler is positioned more forwardly than that of the front end of the tank section, the operator can visually see the position of the front end of the crawler without being hindered by the tank section. With such an arrangement as above, the operator can run the lower travelling structure while confirming a positional relation between the front end of the crawler and the ground.

The present invention is constructed such that the upper structure frame is provided with a passage member positioned at the front side of the tank section and acting as a footing when the operator performs a maintenance work for the driving force source.

With such an arrangement as above, when the driving force source is to be inspected and maintained, the operator can assure a wide working space with the passage member being applied as a footing.

The present invention is constructed such that the passage member is of a structure where the operator in the cab can see the front end of the crawler through it.

With such an arrangement as above, when the operator in the cab visually sees the front end of the crawler, the operator can visually see the front end of the crawler in a sure manner while the operator's field of view is not hindered by the passage member.

BRIEF DESCRIPTION OF THE DRAWINGS

Other objects and advantages of the present invention will become more apparent by reading the following description in reference to the accompanying drawings.

DETAILED DESCRIPTION OF THE INVENTION

Figure 1:
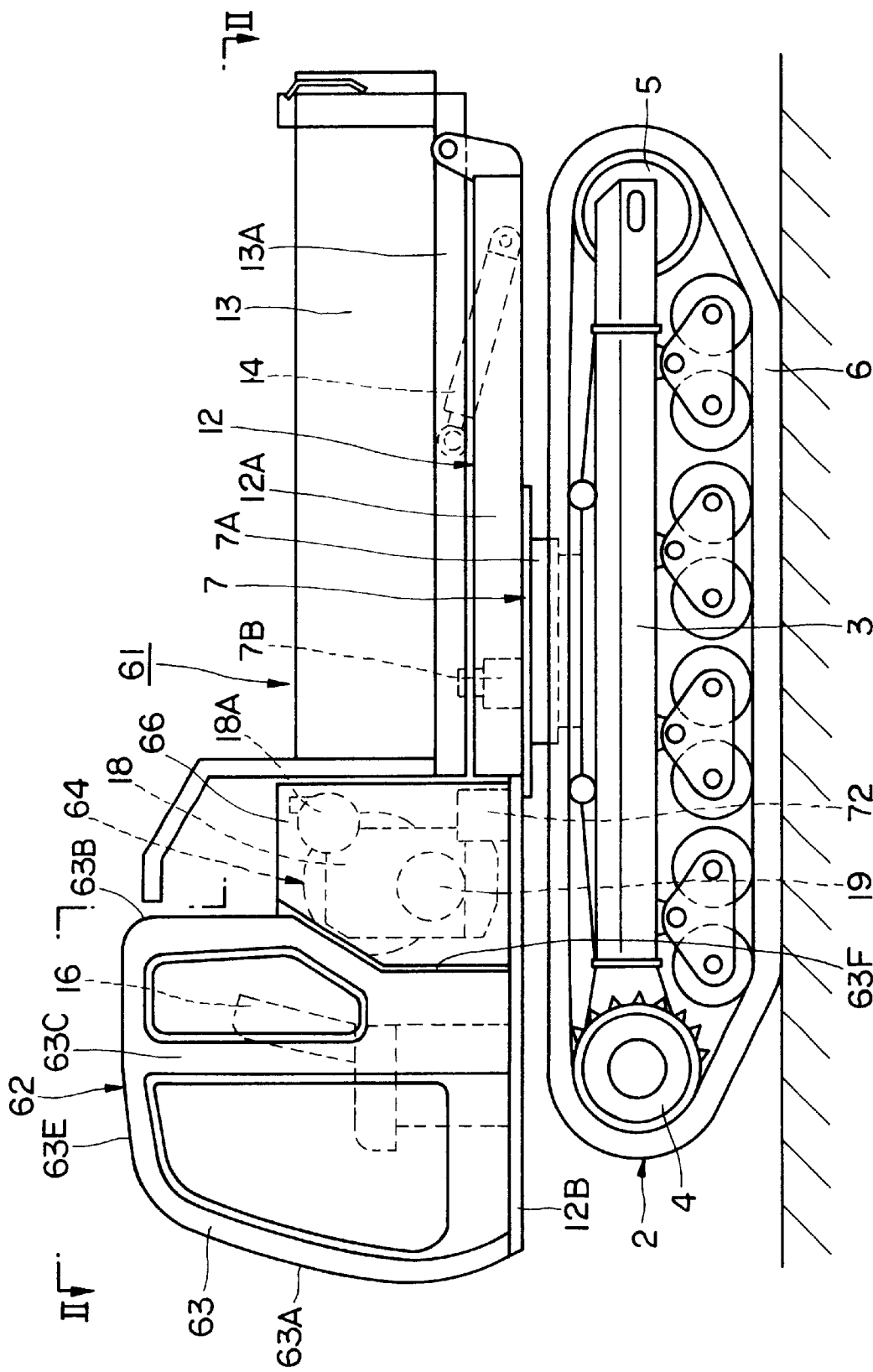
FIG. 1 is a front elevational view for showing a revolving type crawler carrier applied to the first preferred embodiment of the present invention.

Referring now to FIGS. 1 to 10, some preferred embodiments of the crawler carrier in accordance with the present invention will be described in detail.

At first, FIGS. 1 to 4 illustrate a first preferred embodiment, wherein the first preferred embodiment will be described in reference to an example of the revolving type crawler carrier in which an upper structure is installed on a lower travelling structure in such a way that it can be turned. In the first preferred embodiment, the same reference numerals are added to the same composing elements as those of the revolving type crawler carrier 1 in accordance with the aforementioned first prior art and their description will be omitted.

In these figures, reference numeral 61 denotes a revolving type crawler carrier applied to the present preferred embodiment in place of the aforesaid crawler carrier 1 of the first prior art. In this case, the crawler carrier 61 is substantially comprised of a lower travelling structure 2 and an upper revolving structure 62 acting as an upper structure rotatably arranged on the lower travelling structure 2 through a swing mechanism 7 substantially in the same manner as that of the crawler carrier 1 in accordance with the first prior art. Then, the upper revolving structure 62 is constituted of a revolving frame 12 acting as the upper structure frame, a dump body 13, a cab 63, a driving force source 64, a heat exchanger 65 and a tank section 68 or the like to be described later.

Denoted at 63 is a cab used in the preferred embodiment in place of the cab 15 in accordance with the first prior art, wherein the cab 63 is positioned at the front side of the dump body 13, at one side (left side) in the lateral direction and arranged at a support frame 12B of the revolving frame 12. In this case, the cab 63 is formed into a box enclosed by a front surface 63A, a rear surface 63B, left and right side surfaces 63C, 63D and an upper surface 63E, wherein the lower side of the rear surface 63B is formed with a recessed portion 63F recessed to the front surface 63A side. Then, within the cab 63 are installed a driver's seat 16 where an operator sits, travel levers, and operation levers or the like for ascending or descending the dump body 13 (the levers not shown).

Figure 4:
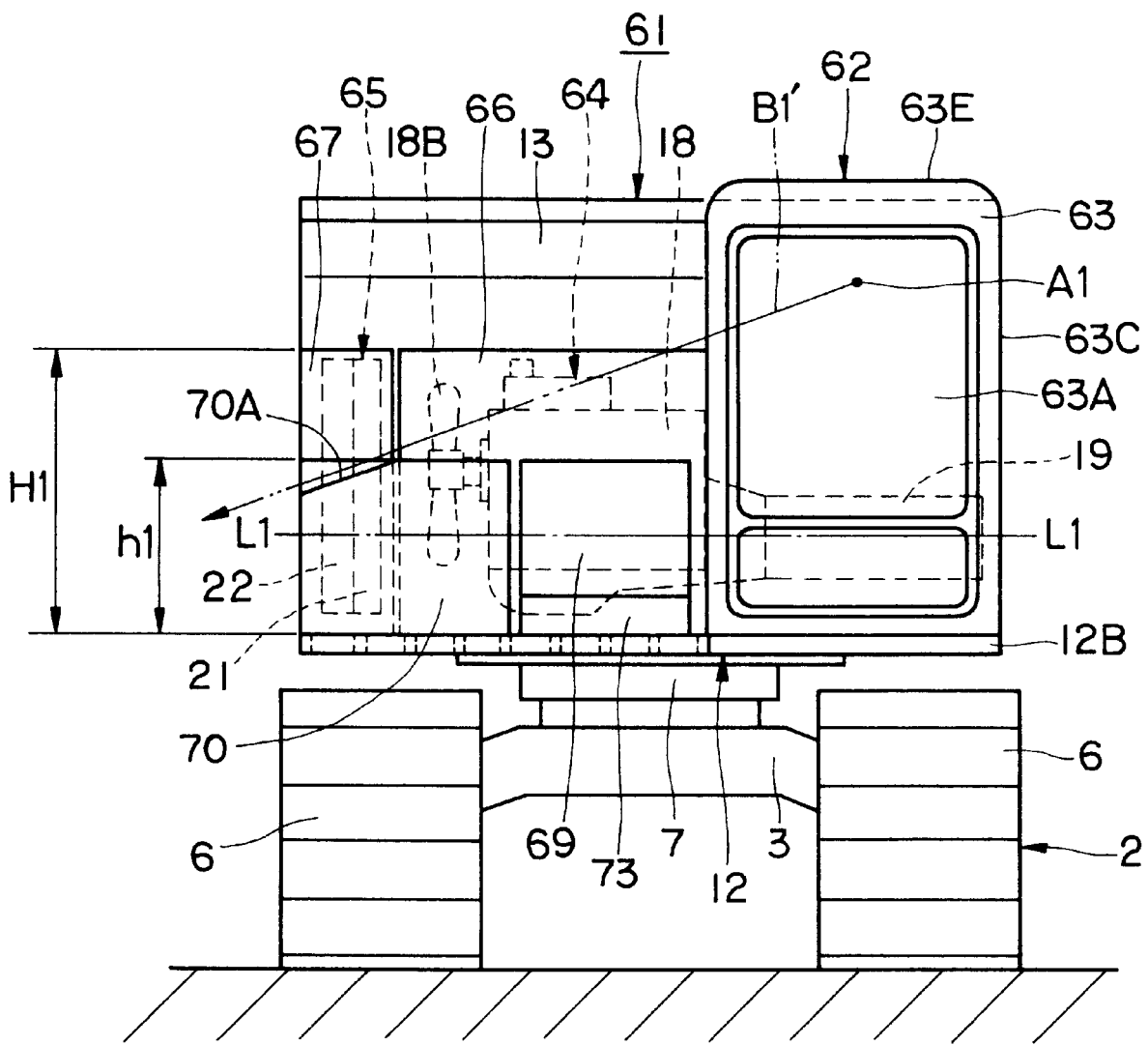
FIG. 4 is a left side elevational view for showing the aforesaid revolving type crawler carrier from its left side.
Figure 5:
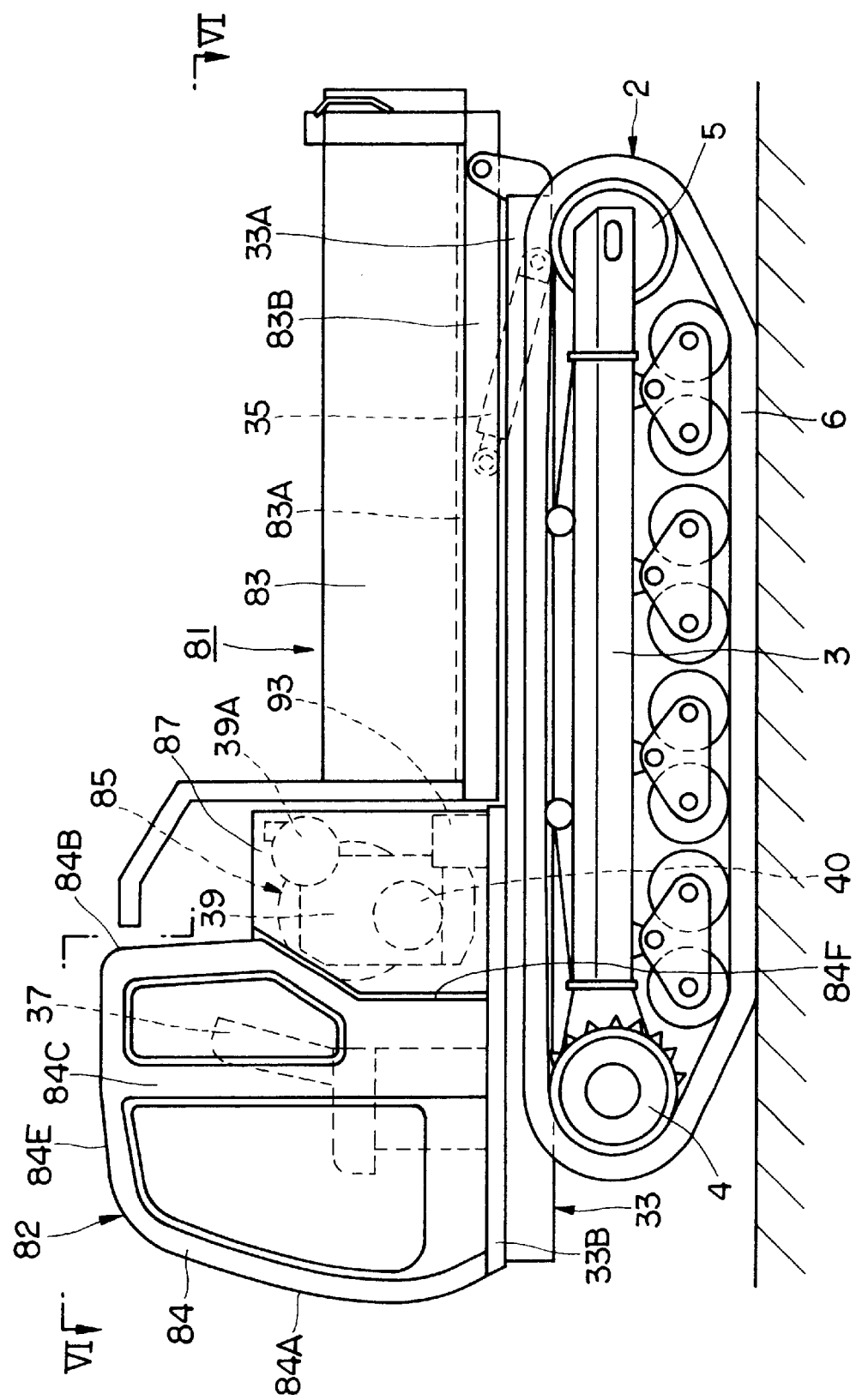
FIG. 5 is a front elevational view for showing a rigid type crawler carrier applied to the second preferred embodiment of the present invention.

Denoted at 64 is a driving force source positioned between the dump body 13 and the cab 63 and installed at the revolving frame 12, wherein the driving force source 64 is comprised of an engine 18 and a hydraulic pump 19 arranged in series in the same manner as that of the driving force source 17 in accordance with the first prior art. However, the driving force source 64 is arranged such that the hydraulic pump 19 is positioned beneath the recessed portion 63F of the cab 63 and the driving force source 64 is laid in a lateral direction in a horizontal state between the dump body 13 and the cab 63 under a condition in which the engine 18 is oppositely faced against the heat exchanger 65 to be described later. With such an arrangement as above, the driving force source 64 is arranged at the revolving frame 12 under a state in which a center L1—L1 of the crank shaft of the engine 18 as shown in FIG. 4 becomes a horizontal state.

Indicated at 65 is a heat exchanger positioned at the front side of the dump body 13, at the other side (right side) in a lateral direction and arranged at the revolving frame 12, wherein the heat exchanger 65 is comprised of a radiator 21 and an oil cooler 22 or the like in the same manner as that of the heat exchanger 20 in accordance with the first prior art. However, the heat exchanger 65 is arranged in series with the driving force source 64 in a lateral direction.

As described above, the driving force source 64 and the heat exchanger 65 extend at the front side of the dump body 13 in a lateral direction and are arranged at the revolving frame 12 under a state in which they are stored in the width size in a lateral direction of the revolving frame 12. With such an arrangement as above, it is not necessary for the hydraulic pump 19 constituting the driving force source 64 to be arranged beneath the dump body 13, wherein the driving force source 64 is arranged at the revolving frame 12 under a state in which it becomes substantially in a horizontal orientation.

Denoted at 66 is an engine cover arranged at the front side of the dump body 13, wherein the engine cover 66 extends from the left side end of the revolving frame 12 in a lateral direction through the lower part of the recessed portion 63F of the cab 63 so as to cover integrally the engine 18 and the hydraulic pump 19 or the like constituting the driving force source 64.

Denoted at 67 is a heat exchanger cover arranged adjacent to the engine cover 66 and at the front side of the dump body 13, wherein the heat exchanger cover 67 covers the radiator 21 and the oil cooler 22 or the like constituting the heat exchanger 65. Then, the upper surfaces of the engine cover 66 and the heat exchanger cover 67 form a substantial same plane at the position of the height size H1 from the revolving frame 12 as shown in FIG. 4.

Reference numeral 68 denotes a tank section positioned at the front side of the driving force source 64 and the heat exchanger 65, at the other side (right side) in a lateral direction and arranged at the revolving frame 12, wherein the tank section 68 is constituted of an operating oil tank 69 arranged adjacent to the right side of the cab 63, and a fuel tank 70 arranged adjacent to the right side of the operating oil tank 69.

In this case, as shown in FIG. 4, the upper surfaces of the operating oil tank 69 and the fuel tank 70 constituting the tank section 68 substantially form the same plane at the position of the height size h1 from the revolving frame 12. Then, the height size h1 of this tank section 68 is set to be lower than the height size H1 of the upper surfaces of the engine cover 66 and the heat exchanger cover 67 (h1<H1). In addition, a chamfered portion 70A inclined downwardly is formed at the right end of the upper surface of the fuel tank 70.

With such an arrangement as above, as shown in FIG. 4, if it is assumed that the eye position (eye point) of an operator who sat at the driver's seat 16 within the cab 63 is defined as A1 and an operator's eye sight when the operator visually sees from this eye point A1 to the rightward side is defined as B1', the position where the eye sight B1' is shielded by the fuel tank 70 can be lowered.

Figure 2:
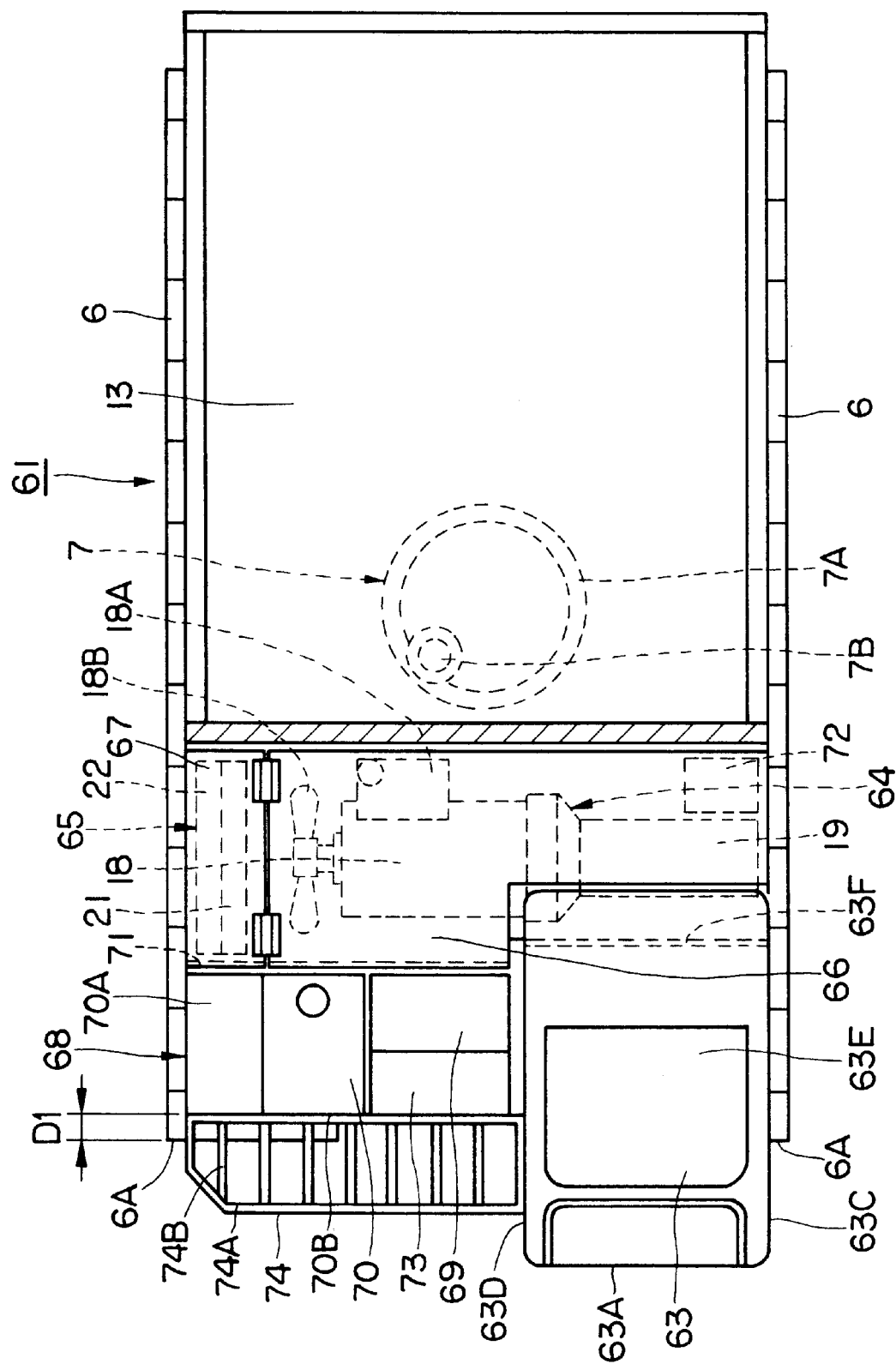
FIG. 2 is a top plan view taken along arrow line II—II in FIG. 1 to show the aforesaid revolving type crawler carrier.
Figure 3:
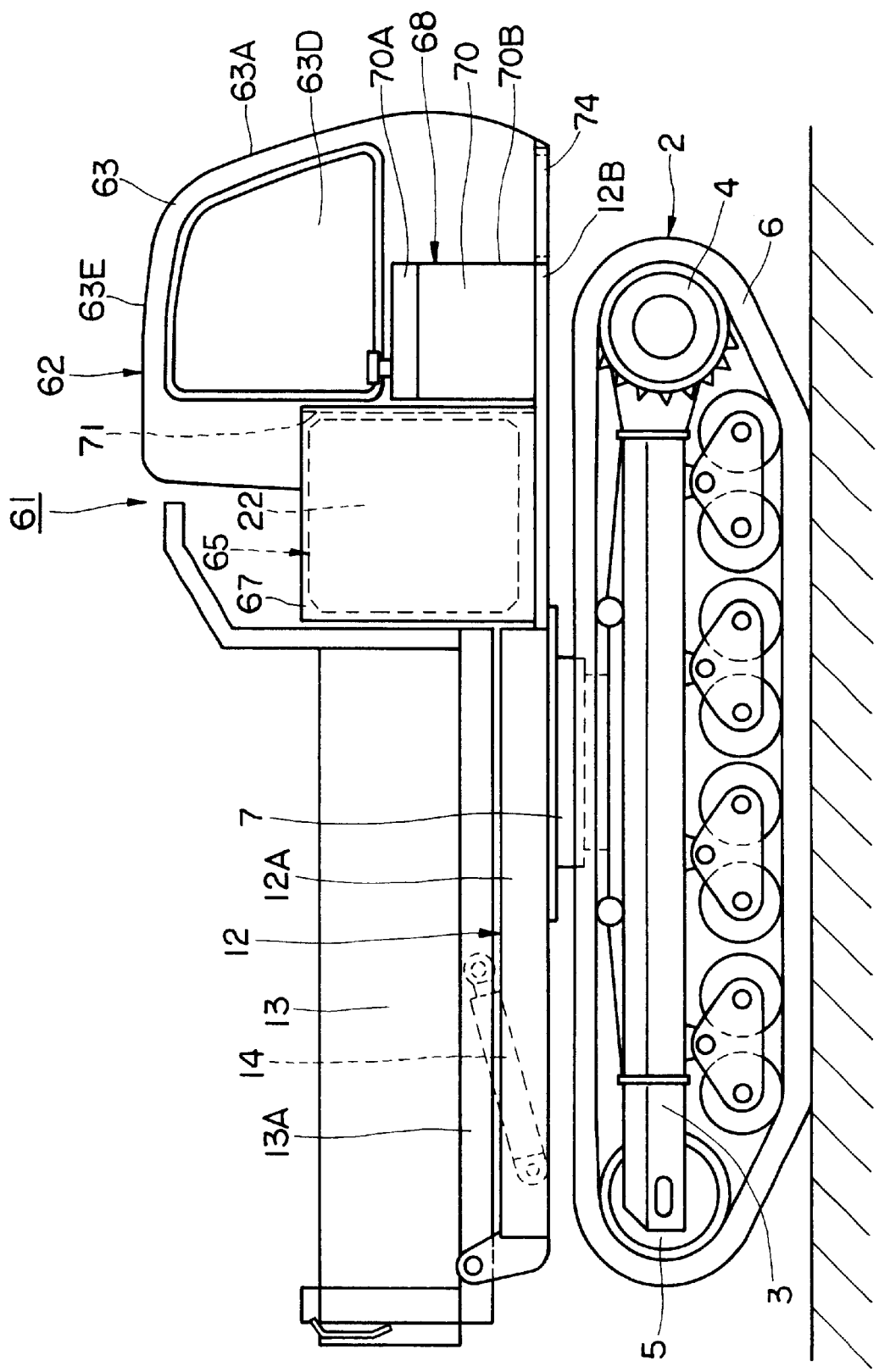
FIG. 3 is a rear view for showing the aforesaid revolving type crawler carrier from its rear side.

In addition, as shown in FIG. 2, the front end 70B of the fuel tank 70 constituting the tank section 68 is retracted from the front end 6A of a crawler 6 by a size D1. With such an arrangement as above, it is constituted such that the operator in the cab 63 can visually see the front end 6A of a crawler 6 without being hindered by the tank section 68 (the fuel tank 70).

Denoted at 71 is a partition plate positioned between the driving force source 64, the heat exchanger 65 and the tank section 68 and extending in a lateral direction, wherein the partition plate 71 is used for restricting heat generated at the engine 18 in the driving force source 64 and at the radiator 21 in the heat exchanger 65 from being transmitted to the operating oil tank 69 and the fuel tank 70.

Indicated at 72 is a control valve positioned near the hydraulic pump 19 and arranged between the dump body 13 and the cab 63, wherein the control valve 72 controls feeding or discharging of hydraulic oil of the hydraulic pump 19 to or from a travel motor (not shown) for the lower travelling structure 2, a swing motor 7B and a dump body ascending or descending cylinder 14 or the like. In addition, numeral 73 denotes a battery positioned at the front side of the operating oil tank 69 and arranged between the cab 63 and the fuel tank 70.

Reference numeral 74 denotes a passage member positioned at the front side of the tank section 68 and arranged at the revolving frame 12, wherein the passage member 74 is fixed to the revolving frame 12 by welding and the like and extends in a lateral direction. Then, the passage member 74 becomes a footing for an operator when the operator performs inspection and maintenance for the engine 18 and the hydraulic pump 19 or the like in the driving force source 64.

In this case, the passage member 74 is comprised of a frame body 74A fixed to the revolving frame 12 and a plurality of cross bars 74B arranged inside the frame body 74A and spaced apart by a certain distance in a lateral direction to form some slits, wherein the operator in the cab 63 can see visually the front end 6A of the crawler 6 through the slit between each of the cross bars 74B.

The revolving type crawler carrier 61 in accordance with the present preferred embodiment has the aforementioned constitution, wherein transporting work for the soil and sand under application of this crawler carrier 61 is not specifically different from that of the crawler carrier 1 in accordance with the first prior art.

Further, the revolving type crawler carrier 61 in accordance with the present preferred embodiment is constituted such that the driving force source 64 is laid to extend in a lateral direction in a horizontal state between the dump body 13 and the cab 63, wherein the driving force source 64 and the heat exchanger 65 are arranged in series in a lateral direction.

With such an arrangement as above, it is not necessary for the driving force source 64 to be inclined in respect to the horizontal direction for avoiding any interference between the dump body 13 and the hydraulic pump 19, wherein the driving force source 64 can be arranged at the revolving frame 12 under a state in which the center L1—L1 of the crank shaft of the engine 18 becomes horizontal.

Due to this fact, in the case that the crawler carrier 61 performs work at a slant ground, it is possible to prevent lubricant oil stored in the oil pan of the engine 18 from being substantially displaced toward the lower site at the slant ground and the engine 18 can be always lubricated properly with the lubricant oil. With such an arrangement as above, the driving force source 64 can be operated smoothly also at the slant ground having a high gradient in a mountain area, for example, to enable an operating range of the crawler carrier 61 to be expanded.

In addition, the driving force source 64 is laid in a lateral direction between the dump body 13 and the cab 63, so that the engine 18 and the hydraulic pump 19 constituting the driving force source 64 can be covered integrally by the engine cover 66. Due to this fact, it is not necessary for the pump cover 24 covering the hydraulic pump 19 as found in the first prior art to be separately arranged and a manufacturing cost of the crawler carrier 61 can be reduced in correspondence with elimination of the pump cover 24.

In addition, the fixing means for fixing the driving force source 64 to the revolving frame 12 can be manufactured easily and the manufacturing cost of the crawler carrier 61 can be reduced.

In addition, the cab 63 is provided with the recessed portion 63F and a part (the hydraulic pump 19) of the driving force source 64 is arranged at the lower side of the recessed portion 63F, thereby it is possible to assure a large working space in the cab 63 while avoiding any interference between the cab 63 and the driving force source 64.

In this case, the engine 18 and the hydraulic pump 19 in the driving force source 64 are arranged in series and the hydraulic pump 19 having a lower height size as compared with that of the engine 18 is arranged below the recessed portion 63F of the cab 63, so that the work space in the cab 63 can be assured more wide.

Further, the driving force source 64 and the heat exchanger 65 are arranged in series at the front side of the dump body 13 in a lateral direction, resulting in that a large space can be assured at the front side of the driving force source 64 and heat exchanger 65 at the right-side position of the cab 63. Due to this fact, the operating oil tank 69 and the fuel tank 70 can be arranged in a surplus manner in the space assured at the right side of the cab 63.

In turn, in the present preferred embodiment, the height size h1 of the tank section 68 comprised of the operating oil tank 69 and the fuel tank 70 is set to be lower than the height size H1 of the upper surfaces of the engine cover 66 and the heat exchanger cover 67 (h1<H1) and the right end side of the upper surface of the fuel tank 70 is provided with the chamfered portion 70A inclined downwardly.

With such an arrangement as above, as shown in FIG. 4, when it is assumed that an eye sight when an operator who sat at the driver's seat 16 in the cab 63 visually sees the rightward direction is defined as B1', it is possible to set position of the eye sight B1' of the operator shielded by the fuel tank 70 low by an amount in which the height size h1 of the fuel tank 70 is set short and by an amount in which the fuel tank 70 is provided with the chamfered portion 70A.

Due to this fact, the operator can see visually from within the cab 63 up to the position near the crawler carrier 61 and then a field of sight of the operator from within the cab 63 can be assured wide. Accordingly, in the case that the upper revolving structure 62 of the crawler carrier 61 is turned, the operator in the cab 63 can turn the upper revolving structure 62 while confirming over a wide range that some hindrance items or other workers or the like are not present around the crawler carrier 61 so as to enable safety characteristic during the turning operation to be increased.

In addition, in the present preferred embodiment, the front end 70B of the fuel tank 70 constituting the tank section 68 is retracted from the front end 6A of the crawler 6 by a size D1, so that the operator in the cab 63 can see with eyes the front end 6A of the crawler 6 without being hindered by the tank section 68 (the fuel tank 70). Due to this fact, in the case that the crawler carrier 61 is to be run at the mountain area, forestry road and the like, the operator can drive the crawler carrier 61 safely while sufficiently confirming the position of the front end 6A of the crawler 6 in respect to a rocky slope of the mountain area, a shoulder of the forestry road and the like.

Further, the revolving frame 12 is provided with the passage member 74 positioned at the front side of the tank section 68 and extending in a lateral direction. Due to this fact, when the engine 18 and the hydraulic pump 19 in the driving force source 64 are to be inspected and maintained, the operator can assure a wide working space with the passage member 74 being applied as a footing and workability in the inspection and maintenance work can be improved.

Further, the operator in the cab 63 can see the front end 6A of the crawler 6 through the slit between each of the cross bars 74B constituting the passage member 74 and drive the crawler carrier 61 safely while visually seeing the front end 6A of the crawler 6 in a positive manner.

Then, FIGS. 5 to 8 illustrate the second preferred embodiment of the present invention, wherein the present preferred embodiment illustrates a case in which the rigid type crawler carrier having the upper structure fixed onto the lower travelling structure. In the present preferred embodiment, the same reference numerals are added to the same composing elements as those of the rigid type crawler carrier 31 in accordance with the aforementioned second prior art and their description will be omitted.

Reference numeral 81 in the figure denotes a rigid type crawler carrier applied to the present preferred embodiment in place of the rigid type crawler carrier 31 in accordance with the aforesaid second prior art. In this case, the crawler carrier 81 is substantially constituted of the lower travelling structure 2 and an upper structure 82 fixed to be arranged at the lower travelling structure 2 in a substantial similar manner as that of the crawler carrier 31 in accordance with the second prior art. Then, the upper structure 82 is constituted by an upper structure frame 33, a dump body 83, a cab 84, a driving force source 85, a heat exchanger 86 and a tank section 89 or the like to be described hereinafter.

Reference numeral 83 denotes a dump body applied in the present preferred embodiment in place of the dump body 34 in accordance with the second prior art, wherein the dump body 83 is formed into a box having bottom with its upper part being opened substantially in the same manner as that of the dump body 34 in accordance with the prior art. However, a bottom plate 83A forming the bottom surface of the dump body 83 has no portion raised by its bottom part as shown by the upper bottom portion 34B in accordance with the second prior art and then it may form a substantial flat surface from the front end to the rear end thereof.

Then, on the lower surface of the bottom plate 83A of the dump body 83 is provided a dump body frame 83B extending in the forward and rearward directions, wherein the rear end of the dump body frame 83B is rotatably connected to the rear end side of a longitudinal beam 33A constituting the upper structure frame 33. In addition, the dump body ascending or descending cylinder 35 is arranged between the dump body frame 83B and the longitudinal beam 33A of the upper structure frame 33.

Denoted at 84 is a cab applied to the present preferred embodiment in place of the cab 36 in accordance with the second prior art, wherein the cab 84 is arranged at the front side of the dump body 83, positioned at one side (left side) in a lateral direction and installed at the support frame 33B of the upper structure frame 33. In this case, the cab 84 is formed into a box enclosed by a front surface 84A, a rear surface 84B, left and right side surfaces 84C and 84D and an upper surface 84E, wherein the lower side of the rear surface 84B is formed with a recessed portion 84F recessed to the front surface 84A side. Then, a driver's seat 37 where an operator sits is installed in the cab 84.

Figure 8:
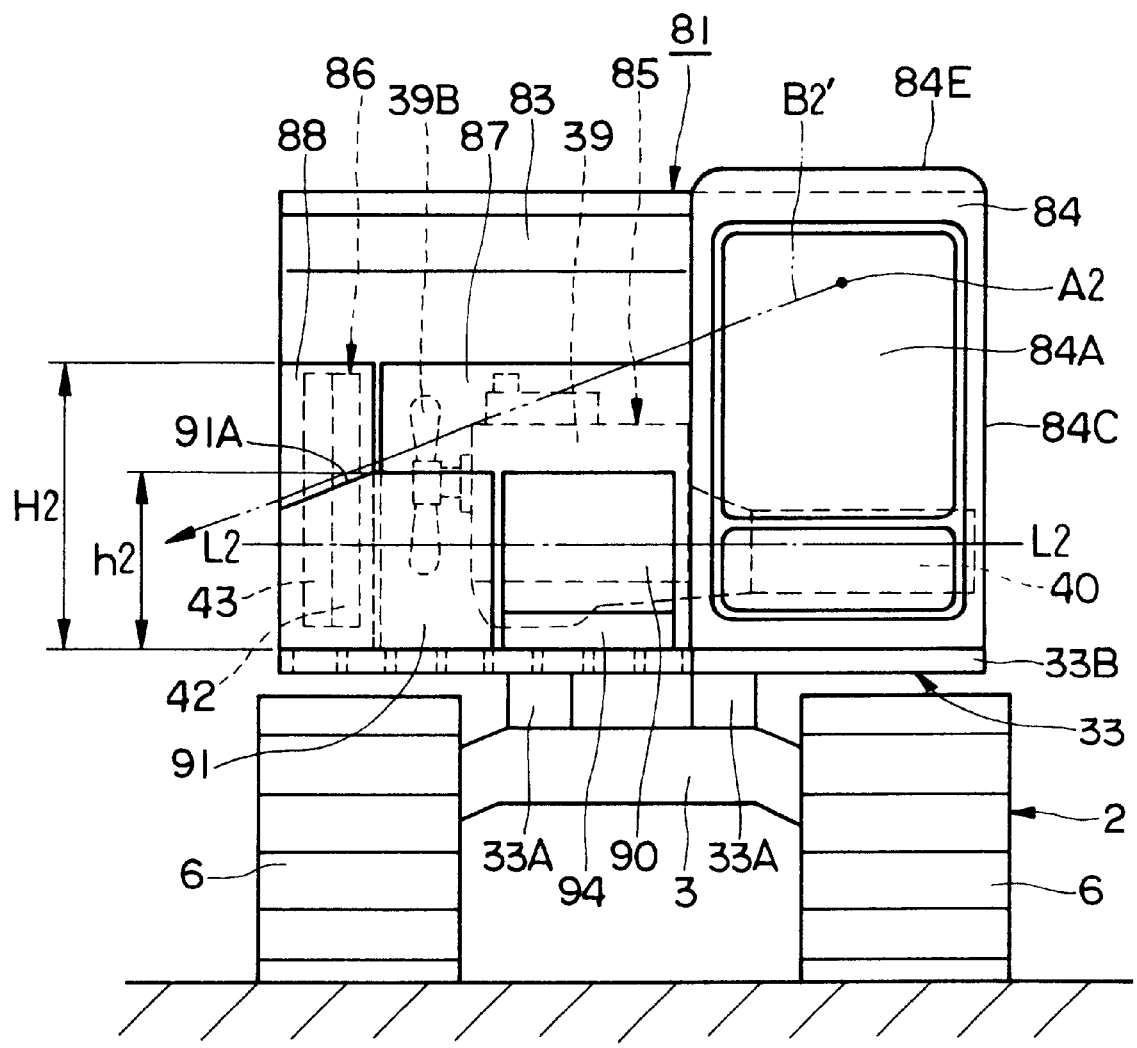
FIG. 8 is a left side elevational view for showing the aforesaid rigid type crawler carrier from its left side.
Figure 9:
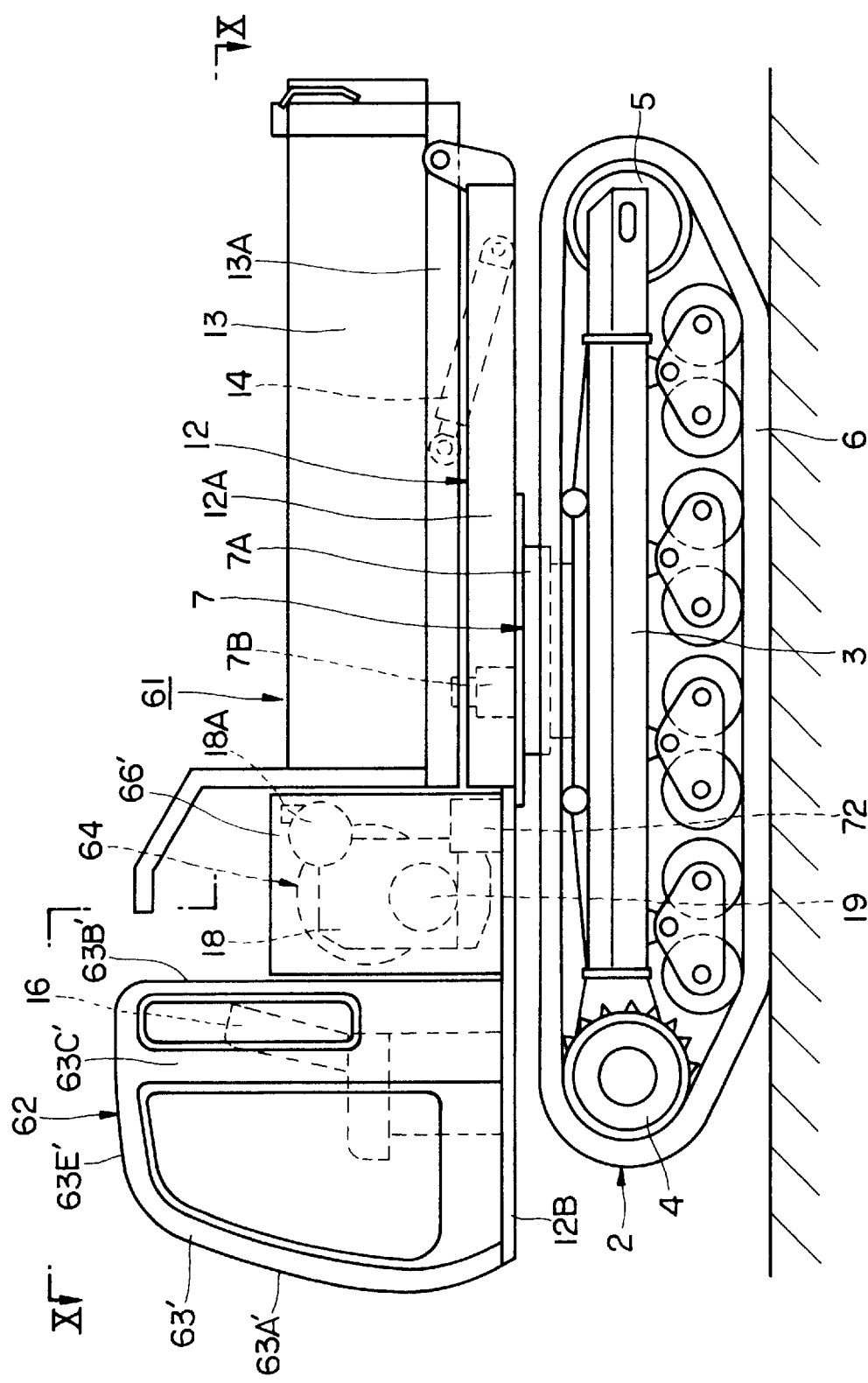
FIG. 9 is a front elevational view similar to FIG. 1 for showing the crawler carrier provided with a cab in accordance with a modified embodiment.
Figure 10:
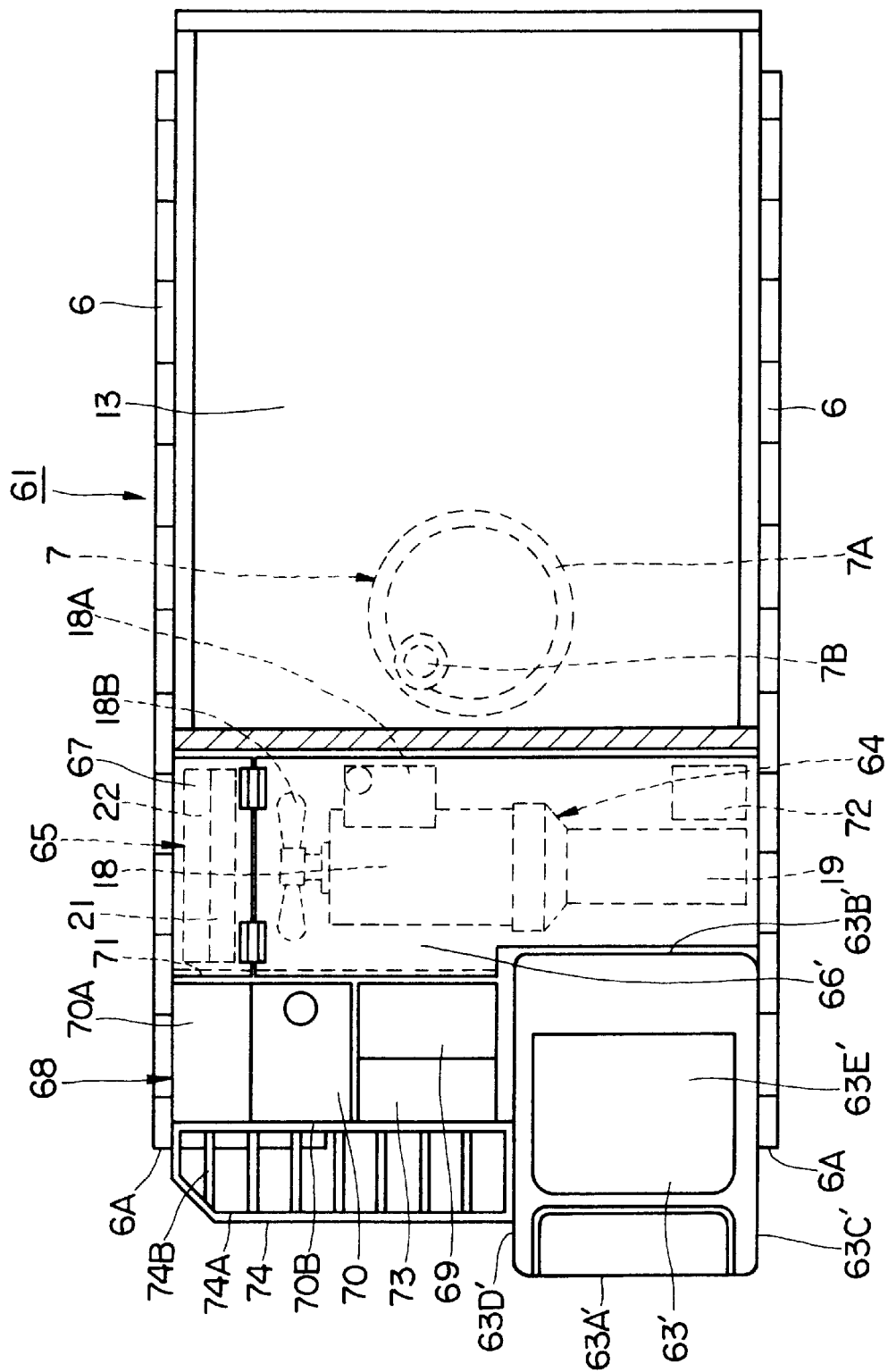
FIG. 10 is a top plan view taken along arrow line X—X in FIG. 9 for showing a crawler carrier provided with a cab in accordance with a modified embodiment.
Figure 11:
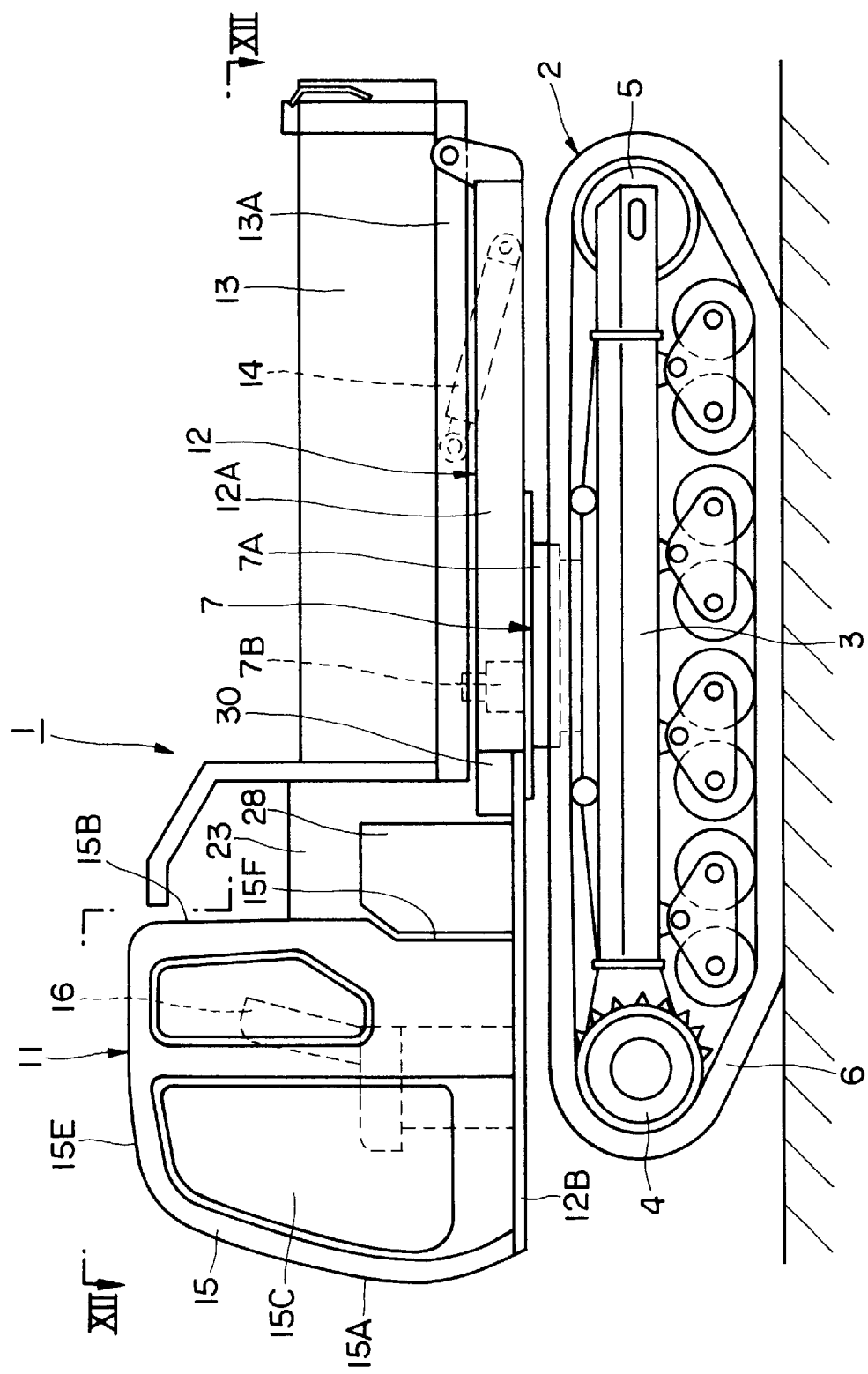
FIG. 11 is a front elevational view for showing a revolving type crawler carrier in accordance with the first prior art.
Figure 12:
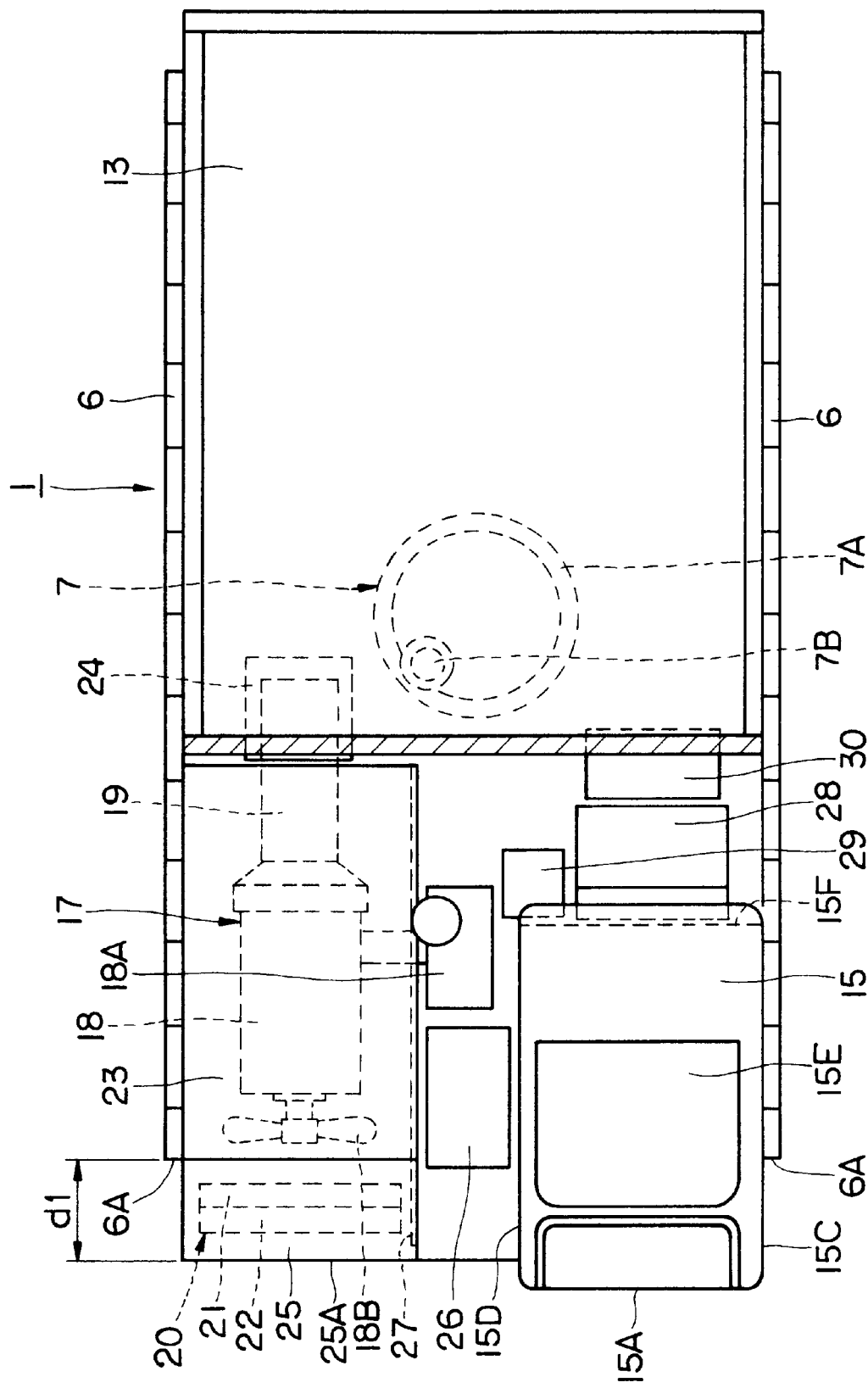
FIG. 12 is a top plan view taken along arrow line XII—XII in FIG. 11 for showing a revolving type crawler carrier in accordance with the first prior art.
Figure 13:
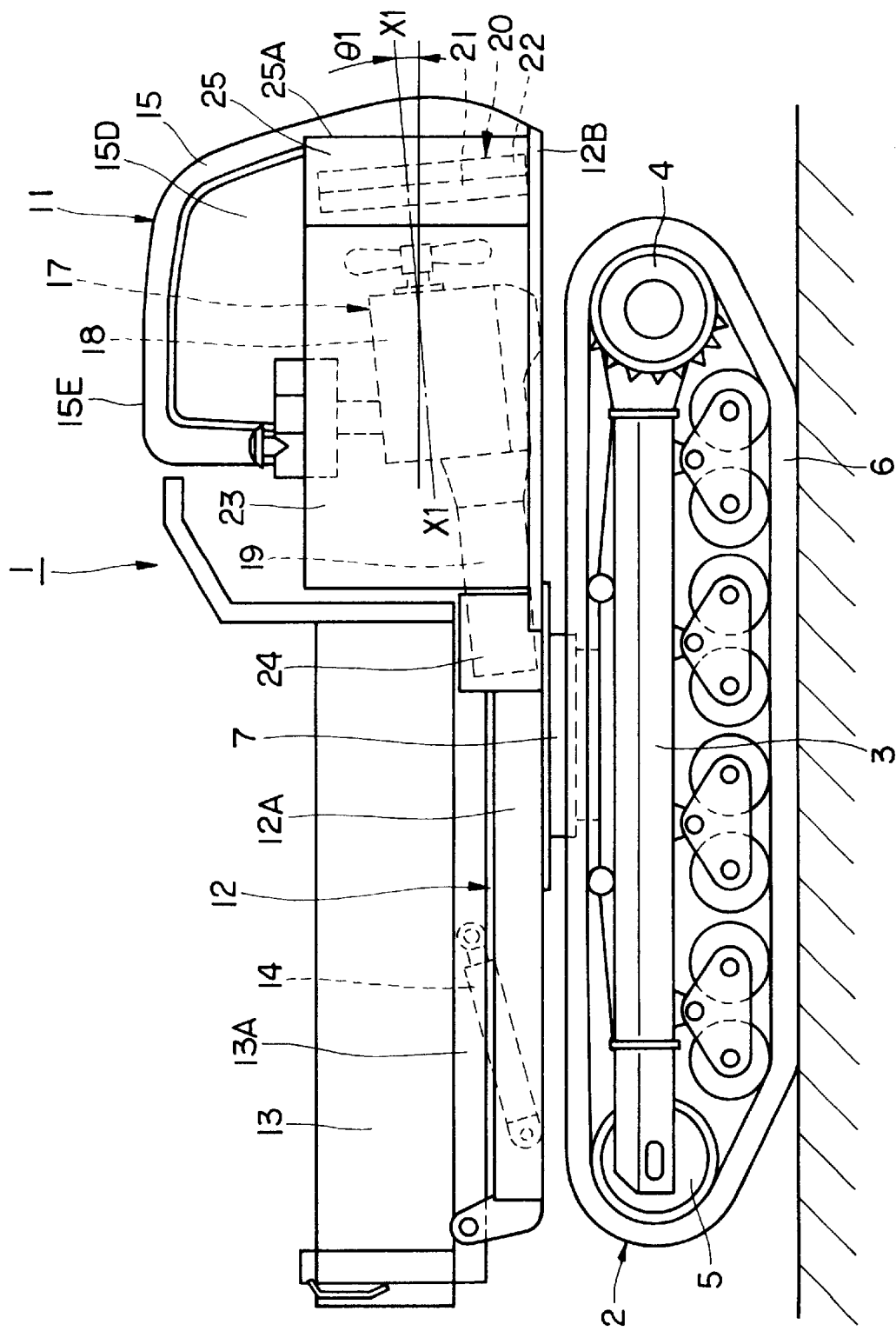
FIG. 13 is a rear view for showing a revolving type crawler carrier in accordance with the first prior art from its rear surface.
Figure 14:
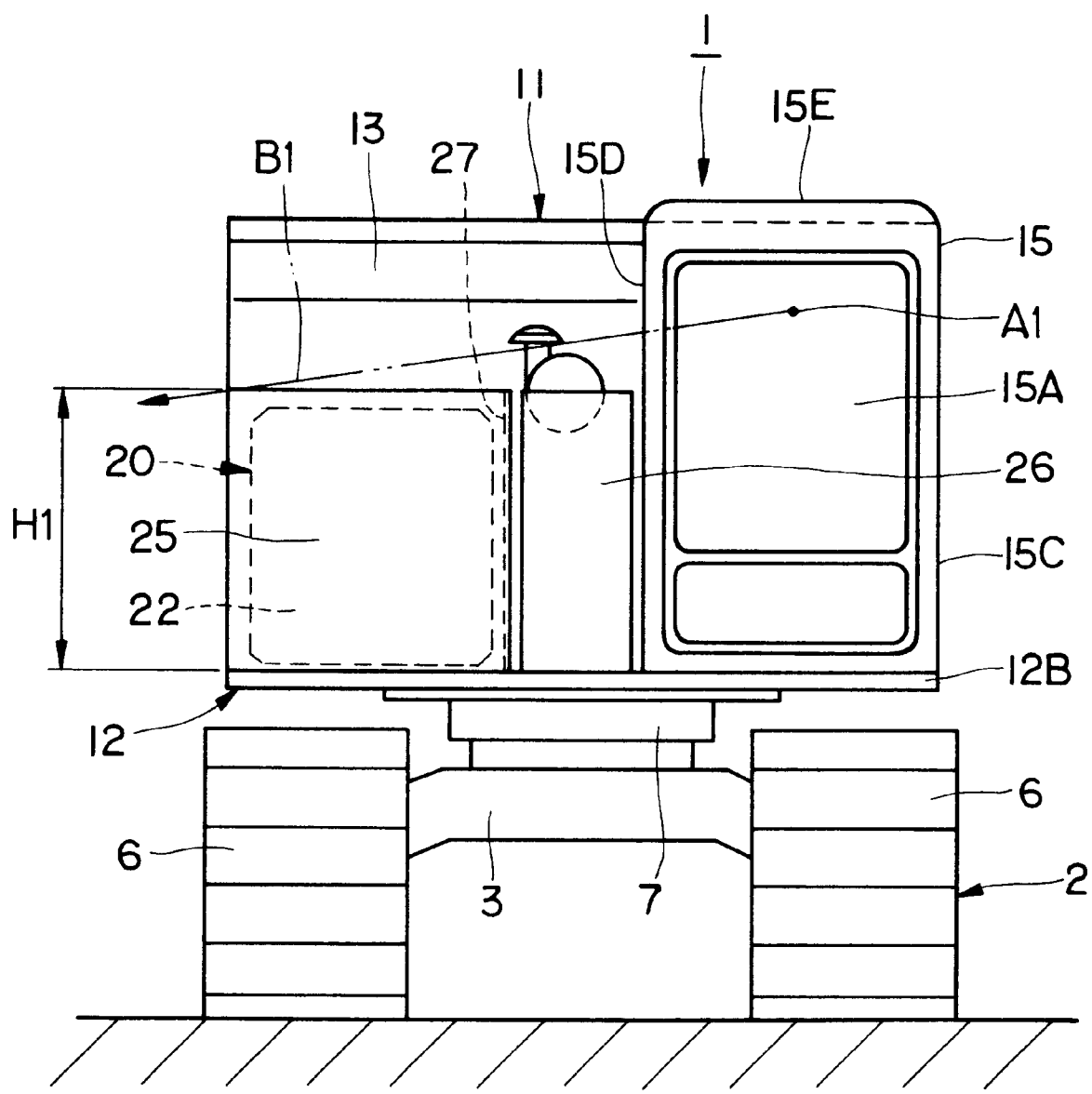
FIG. 14 is a left side elevational view for showing a revolving type crawler carrier in accordance with the first prior art from its left side.
Figure 15:
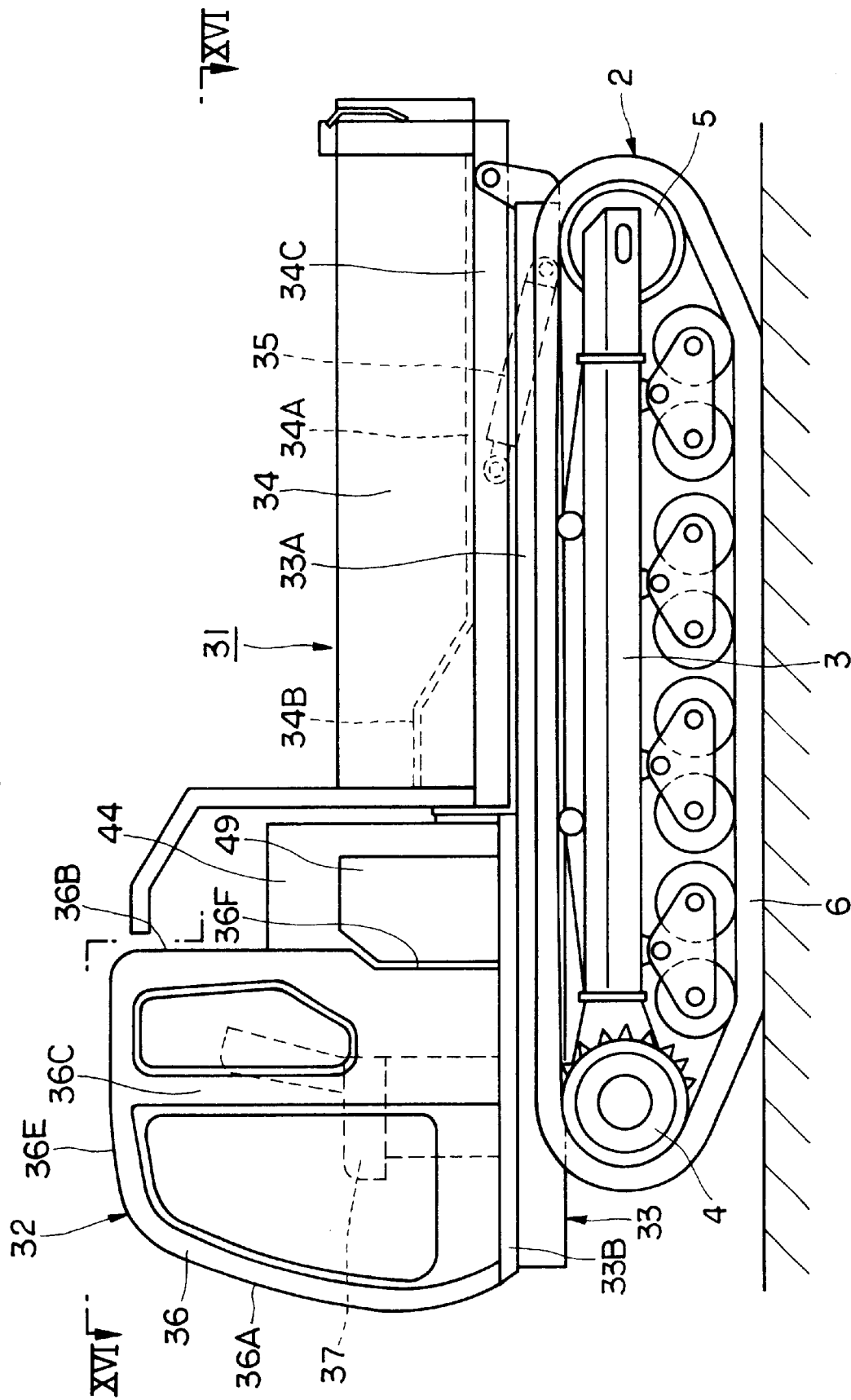
FIG. 15 is a front elevational view for showing a rigid type crawler carrier in accordance with a second prior art.
Figure 16:
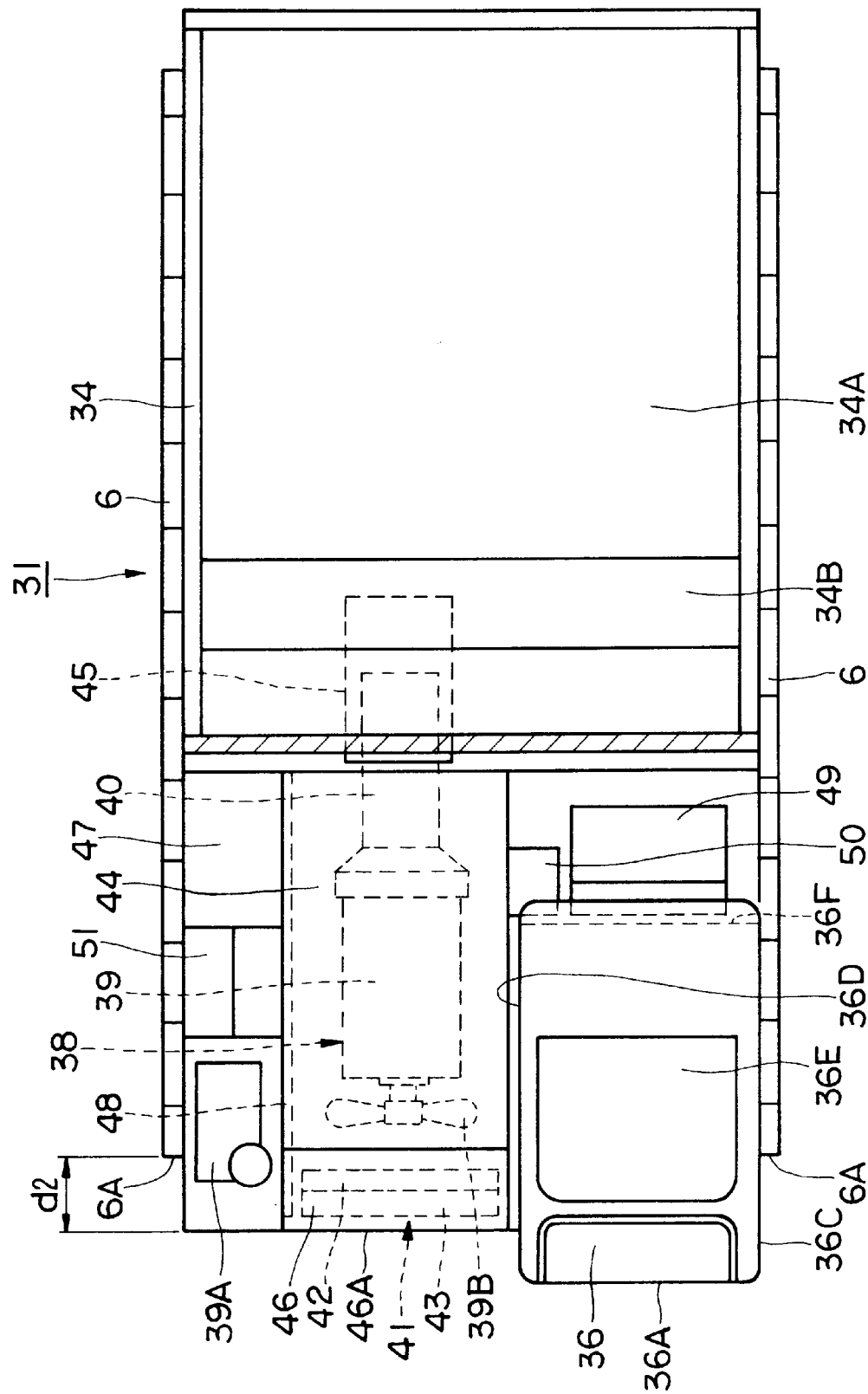
FIG. 16 is a top plan view taken along arrow line XVI—XVI in FIG. 15 for showing a rigid type crawler carrier in accordance with the second prior art.
Figure 17:
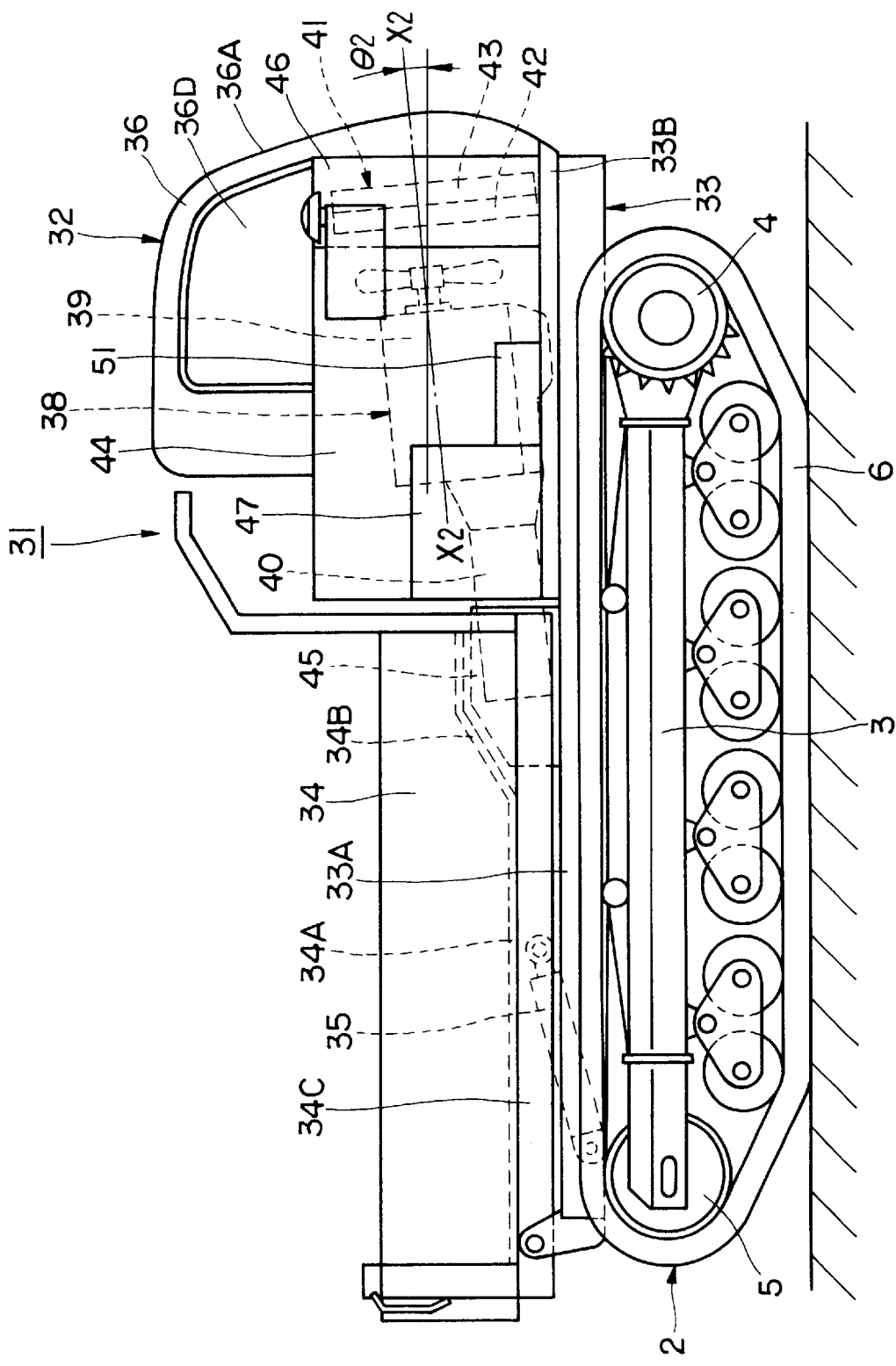
FIG. 17 is a rear view for showing a rigid type crawl carrier in accordance with the second prior art from its rear side.
Figure 18:
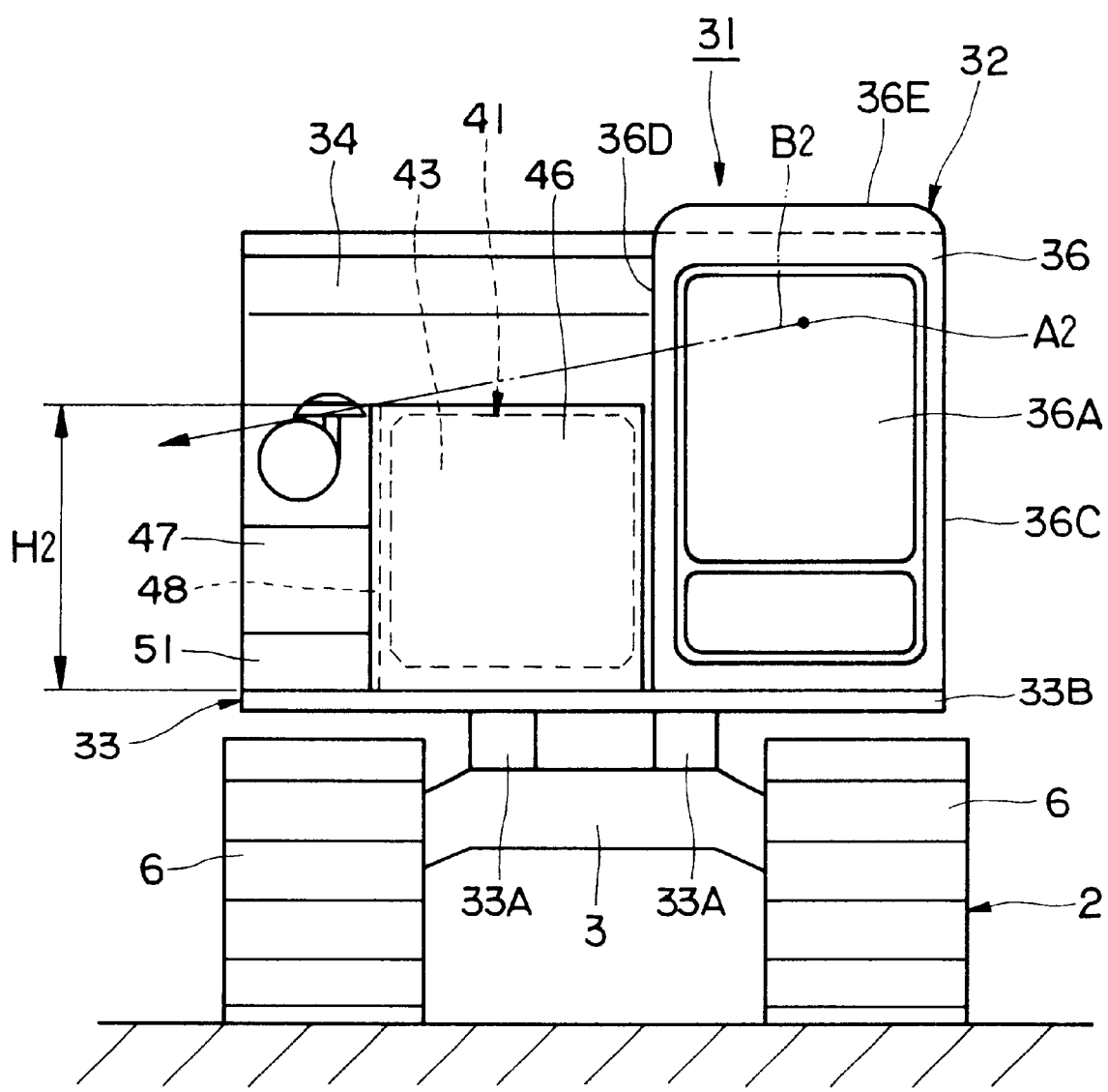
FIG. 18 is a left side elevational view for showing a rigid type crawler carrier in accordance with the second prior art from its left side.

Denoted at 85 is a driving force source positioned between the dump body 83 and the cab 84 and arranged at the upper structure frame 33, wherein the driving force source 85 is comprised of an engine 39 and a hydraulic pump 40 in the same manner as that of the driving force source 38 in accordance with the second prior art. However, the driving force source 85 is arranged such that the hydraulic pump 40 is positioned at the lower side of the recessed portion 84F of the cab 84 and the driving force source 85 is laid in a lateral direction in a horizontal state between the dump body 83 and the cab 84 while the engine 39 is being faced against the heat exchanger 86 to be described later. With such an arrangement as above, the driving force source 85 is arranged at the upper structure frame 33 under a state in which the center L2—L2 of the crank shaft of the engine 39 is in a horizontal state as shown in FIG. 8.

Indicated at 86 is a heat exchanger positioned at the front side of the dump body 83, at the other side (right side) in a lateral direction and arranged at the upper structure frame 33, wherein the heat exchanger 86 is constituted by a radiator 42 and an oil cooler 43 or the like in the same manner as that of the heat exchanger 41 in accordance with the second prior art. However, the heat exchanger 86 is arranged in series with the driving force source 85 in a lateral direction.

Denoted at 87 is an engine cover arranged at the front side of the dump body 83, wherein the engine cover 87 extends from the left end of the upper structure frame 33 in a lateral direction through the lower side of the recessed portion 84F of the cab 84 so as to integrally cover the engine 39 and the hydraulic pump 40 constituting the driving force source 85.

Denoted at 88 is a heat exchanger cover arranged to be adjacent to the engine cover 87 and installed at the front side of the dump body 83, wherein the heat exchanger cover 88 covers the radiator 42 and the oil cooler 43 or the like constituting the heat exchanger 86. Then, the upper surfaces of the engine cover 87 and the heat exchanger cover 88 form a substantial same flat surface at the position of the height size H2 from the upper structure frame 33 as shown in FIG. 8.

Reference numeral 89 denotes a tank section positioned at the front side of the driving force source 85 and the heat exchanger 86, at the other side (right side) in a lateral direction and arranged at the upper structure frame 33, wherein the tank section 89 is constituted of an operating oil tank 90 arranged adjacent to the right side of the cab 84 and a fuel tank 91 arranged adjacent to the right side of the operating oil tank 90.

In this case, the upper surfaces of the operating oil tank 90 and the fuel tank 91 constituting the tank section 89 form a substantial same flat surface at the position of the height size h2 from the upper structure frame 33. Then, the height size h2 at the tank section 89 is set to be lower than the height size H2 of the upper surfaces of the engine cover 87 and the heat exchanger cover 88 (h2<H2). In addition, the right end of the upper surface of the fuel tank 91 is formed with the chamfered portion 91A inclined downwardly.

Figure 6:
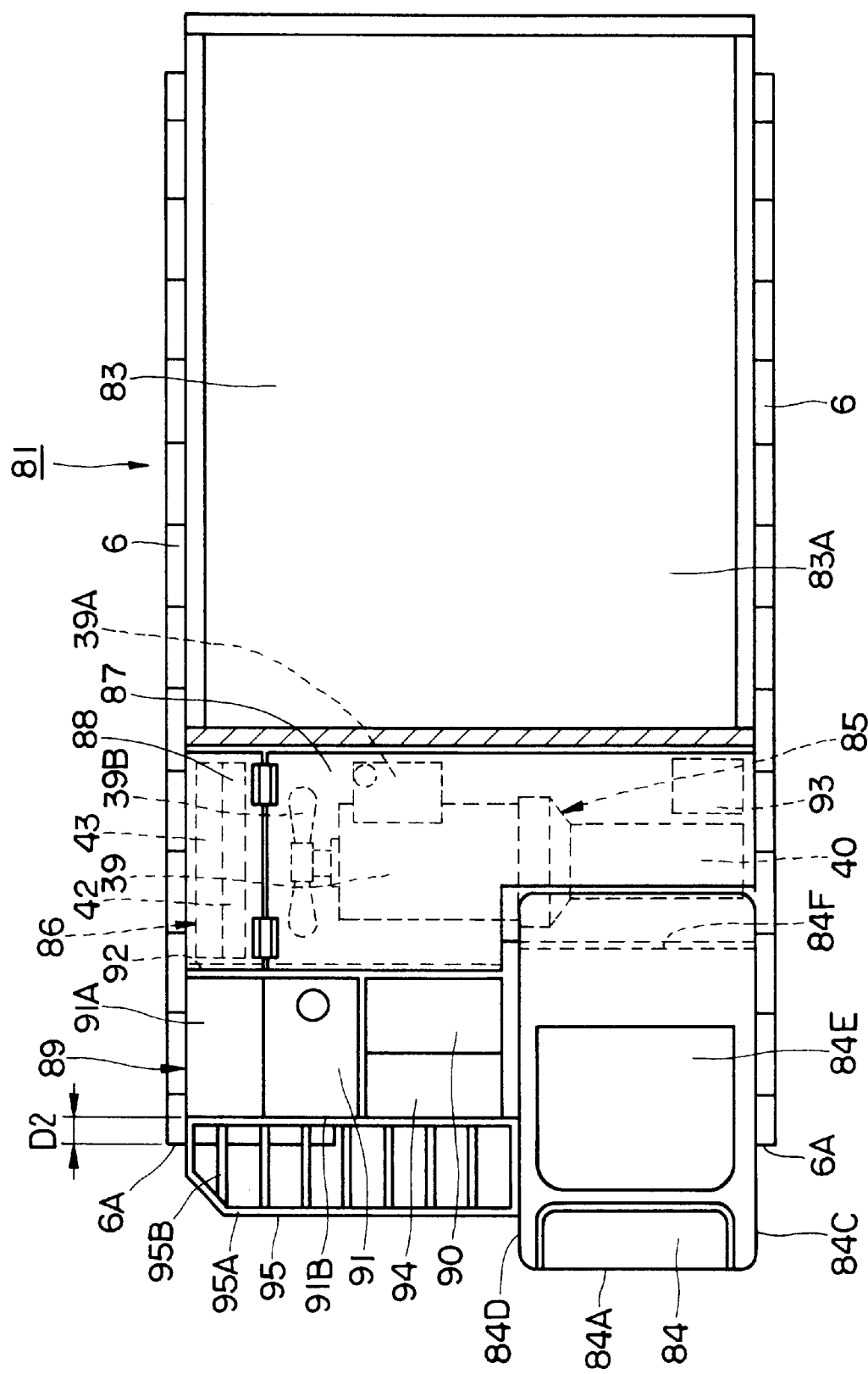
FIG. 6 is a top plan view taken along arrow line VI—VI in FIG. 5 to show the aforesaid rigid type crawler carrier.
Figure 7:
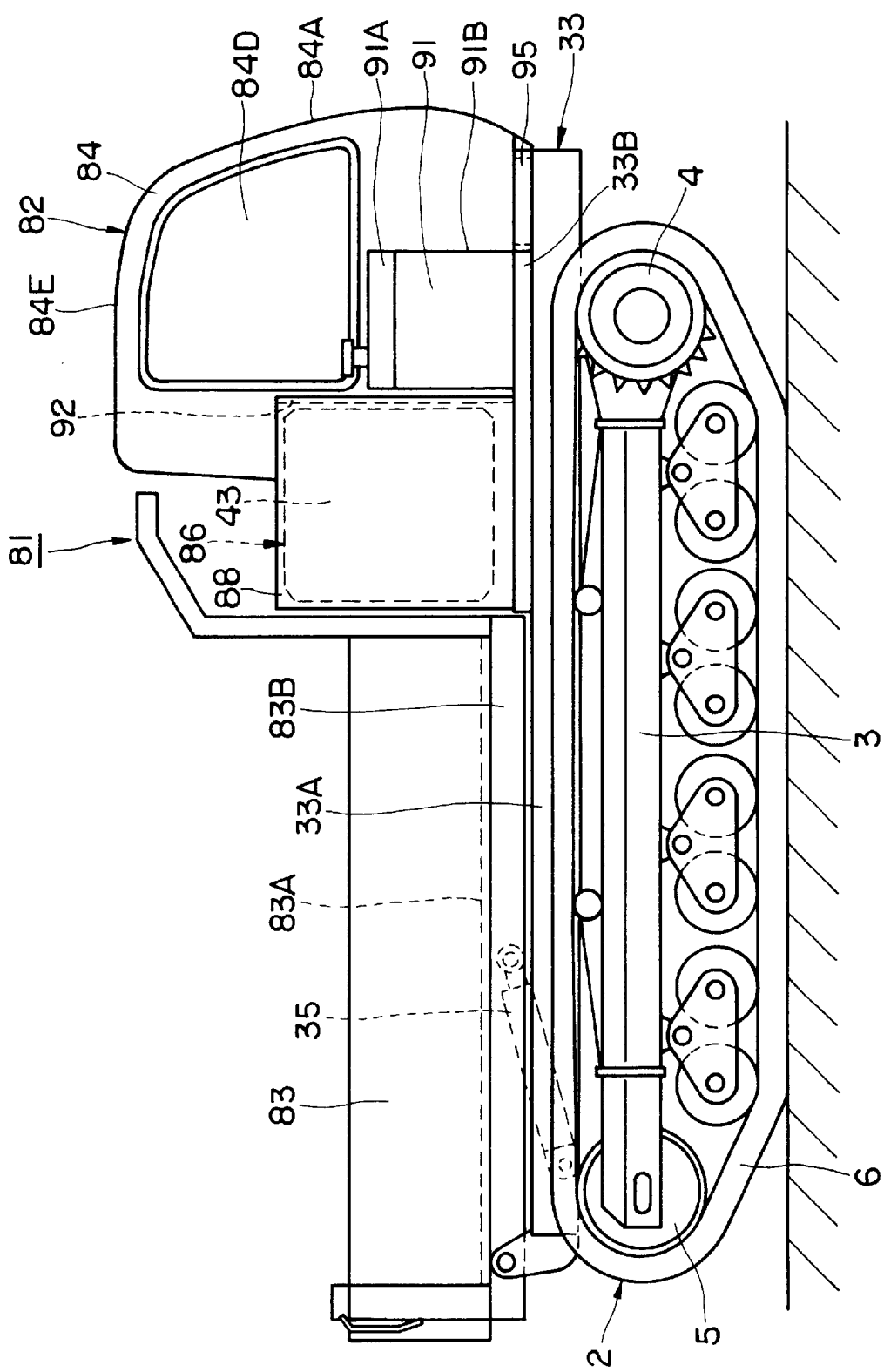
FIG. 7 is a rear view for showing the aforesaid rigid type crawler carrier from its rear side.

In addition, as shown in FIG. 6, the front end 91B of the fuel tank 91 is retracted from the front end 6A of the crawler 6 by a size D2, wherein the operator within the cab 84 can see visually the front end 6A of the crawler 6 without being hindered by the fuel tank 91.

Denoted at 92 is a partition plate positioned between the driving force source 85, the heat exchanger 86 and the tank section 89 and extending in a lateral direction, wherein the partition plate 92 prevents heat generated at the driving force source 85 and the heat exchanger 86 from being transmitted to the operating oil tank 90 and the fuel tank 91.

Numeral 93 denotes a control valve positioned near the hydraulic pump 40 and arranged between the dump body 83 and the cab 84 to control feeding or discharging of hydraulic oil of the hydraulic pump 40 to or from the travel motor (not shown) for the lower travelling structure 2 or the like. In addition, numeral 94 denotes a battery positioned at the front side of the operating oil tank 90 and arranged between the cab 84 and the fuel tank 91.

Numeral 95 denotes a passage member positioned at the front side of the tank section 89 and arranged at the upper structure frame 33, wherein the passage member 95 is comprised of a frame body 95A fixed to the upper structure frame 33 and a plurality of cross bars 95B arranged inside the frame body 95A to form some slits. Then, the passage member 95 may act as a footing for the operator when inspection and maintenance are carried out for the engine 39 and the hydraulic pump 40 or the like in the driving force source 85.

The rigid type crawler carrier 81 in accordance with the present preferred embodiment has such a constitution as one described above and the transporting work for soil and sand under application of this crawler carrier 81 is not specifically different from that of the crawler carrier 31 in accordance with the second prior art.

Thus, the rigid type crawler carrier 81 in accordance with the present preferred embodiment is constructed such that the driving force source 85 is arranged between the dump body 83 and the cab 84 and laid to extend in a horizontal orientation in a lateral direction, wherein the driving force source 85 and the heat exchanger 86 are arranged in series in a lateral direction.

With such an arrangement as above, it is not necessary for the driving force source 85 to be inclined in respect to a horizontal direction so as to avoid any interference between the dump body 83 and the hydraulic pump 40, wherein the driving force source 85 can be arranged at the upper structure frame 33 under a state in which a center L2—L2 of the crank shaft of the engine 39 becomes horizontal. Due to this fact, in the case that the crawler carrier 81 performs the work at the slant ground, it is possible to prevent the lubricant oil stored in the oil pan of the engine 39 from being substantially displaced toward the low slant ground, wherein the driving force source 85 can be operated smoothly even at a slant ground having a high gradient such as a mountain area or the like, for example.

In addition, it does not become necessary to arrange the upper bottom portion for a voiding interference with the hydraulic pump 40 at the dump body 83 even if the dump body 83 is arranged at the lower position in order that the crawler carrier 81 do not need to be provided with the swing mechanism between the track frame 3 and the upper structure frame 33. Due to this fact, it is possible to increase a capacity of the dump body 83, facilitate a manufacturing of the dump body 83 and contribute to reduction in cost of manufacturing.

In turn, in the form of the present preferred embodiment, the height size h2 of the tank section 89 comprised of the operating oil tank 90 and the fuel tank 91 is set to be lower than the height size H2 of the upper surfaces of the engine cover 87 and the heat exchanger cover 88 (h2<H2), and the right end side of the upper surface of the fuel tank 91 is provided with the chamfered portion 91A inclined downwardly.

With such an arrangement as above, as shown in FIG. 8, if it is assumed that the eye position (eye point) of the operator in the cab 84 is defined as A2 and an eye sight when the operator visually sees from this eye point A2 to the right side is defined as B2', it is possible to lower the position where the operator's eye sight B2' is shielded by the fuel tank 91 by an amount where the height size h2 of the fuel tank 91 is decreased and by an amount where the fuel tank 91 is provided with the chamfered portion 91A. Due to this fact, it is possible to assure a substantial wide field of view of the operator from within the cab 84, and the operator can drive the crawler carrier 81 safely while confirming the surroundings of the crawler carrier 81 over the wide range.

In addition, since the front end 91B of the fuel tank 91 constituting the tank section 89 is retracted from the front end 6A of the crawler 6 by a size D2, the operator in the cab 84 is not hindered by the tank section 89 (the fuel tank 91) and can drive the crawler carrier 81 safely while visually seeing the front end 6A of the crawler 6 in a positive manner.

Further, the upper structure frame 33 is provided with a passage member 95 positioned at the front side of the tank section 89 to extend in a lateral direction, so that the operator can perform an inspection and a maintenance work for the engine 39 and the hydraulic pump 40 of the driving force source 85 with the passage member 95 being applied as a footing.

The revolving type crawler carrier 61 in accordance with the aforementioned first preferred embodiment is constructed such that the recessed portion 63F is provided at the lower side of the rear surface 63B of the cab 63 and the hydraulic pump 19 constituting the driving force source 64 is arranged beneath the recessed portion 63F. However, the present invention is not limited to this preferred embodiment, it may be provided with a cab of the modified example shown in FIGS. 9 and 10, for example.

That is, the reference numerals of the same composing elements as those of the first preferred embodiment are added with dash ('), and the cab 63' of the modification is enclosed by a front surface 63A', a rear surface 63B', left and right side surfaces 63C' and 63D' and an upper surface 63E'. However, the rear surface 63B' forms a straight shape and is constituted to have no recessed portion therein. Then, the driving force source 64 is arranged between the rear surface 63B' of the cab 63' and the dump body 13. The engine cover 66' covering the driving force source 64 does not require such as the engine cover 66 in accordance with the first preferred embodiment where it enters into the lower side of the recessed portion 63F of the cab 63, but it is formed into a box extending in a lateral direction. These facts may also similarly be applied to the rigid type crawler carrier 81 in accordance with the second preferred embodiment.

In addition, in the aforementioned first preferred embodiment, although the example in which the cab 63 is positioned at the front side of the dump body 13 and arranged at the left side of the revolving frame 12 has been described, the present invention is not limited to this embodiment and the constitution in which the cab 63 is arranged at the right side of the revolving frame 12, for example, may also be applicable. This fact may also be applicable to the cab 84 applied to the second preferred embodiment.

In addition, in the case of the aforementioned first preferred embodiment, the example in which the operating oil tank 69 constituting the tank section 68 is arranged at the right side of the cab 63 and the fuel tank 70 is arranged at the right side of the operating oil tank 69 has been described, although the present invention is not limited to this embodiment, but it may also be applicable that the fuel tank 70 is arranged at the right side of the cab 63, for example, and the operating oil tank 69 is arranged at the right side of the fuel tank 70. This embodiment is similarly applicable to the operating oil tank 90 and the fuel tank 91 applied to the second preferred embodiment.

Further, in the aforementioned first preferred embodiment, although the embodiment in which the passage member 74 is formed into a slit shape by the frame body 74A and a plurality of cross bars 74B has been described, the present invention is not limited to this embodiment, but it may be formed into some grids and nets, for example. This modification may also be applicable to the passage member 95 in accordance with the second preferred embodiment.

Although the present invention has been described with reference to the preferred embodiments, it is apparent that the present invention is not limited to the aforementioned preferred embodiments, but various modifications can be attained without departing from its scope.

What is a claimed is:

1. A crawler carrier comprising a lower travelling structure having crawlers positioned at both right and left sides and extending in forward and rearward directions, and an upper structure arranged on said lower travelling structure: wherein said upper structure is constituted by an upper structure frame forming a supporting structure, a dump body arranged at the rear side of said upper structure frame to load an article to be transported, a cab positioned at a front side of said dump body and positioned at one side in a lateral direction and arranged at said upper structure frame, a driving force source having an engine and a hydraulic pump and arranged in a lateral direction between said dump body and said cab, and a heat exchanger positioned at the front side of said dump body and positioned at the other side in the lateral direction and arranged in series with said driving force source in a lateral direction.

2. A crawler carrier according to claim 1, wherein said cab is provided with a recessed portion having a rear lower side recessed, said driving force source is arranged between said dump body and said cab under a state in which a part of said driving force source is positioned at the lower side of the recessed portion of said cab.

3. A crawler carrier according to claim 2, wherein said driving force source has the engine and the hydraulic pump arranged in series, said hydraulic pump is arranged at the recessed portion side of said cab, said engine is oppositely faced against said heat exchanger.

4. A crawler carrier according to claim 1, wherein said upper structure frame is provided with a tank section positioned at the front side of said driving force source and said heat exchanger, positioned at the other side in a lateral direction and comprised of an operating oil tank and a fuel tank.

5. A crawler carrier according to claim 4, wherein the height size of said tank section is set to be smaller than the height size of a cover covering said driving force source and said heat exchanger.

6. A crawler carrier according to claim 4, wherein said tank section is arranged at said upper structure frame at a position where the front end of said tank section is retracted from the front end of said crawlers arranged at said lower travelling structure.

7. A crawler carrier according to claim 4, wherein said upper structure frame is provided with a passage member positioned at the front side of said tank section and acting as a footing for an operator during maintenance of said driving force source.

8. A crawler carrier according to claim 7, wherein said passage member is composed such that an operator within said cab can see the front end of said crawler located at the other side in the lateral direction through said passage member.

9. A crawler carrier according to claim 1, wherein said upper structure is rotatably arranged on said lower travelling structure through a swing mechanism.

10. A crawler carrier according to claim 1, wherein said upper structure is arranged to be fixed onto said lower travelling structure.

* * * * *